United States Patent
Ito et al.

(10) Patent No.: US 6,473,704 B1
(45) Date of Patent: Oct. 29, 2002

(54) INFORMATION GUIDANCE SYSTEM

(75) Inventors: Keiji Ito; Shuichi Sasaki; Tetsuo Shiratori, all of Kamakura; Takuro Hatakeyama, Yokohama, all of (JP)

(73) Assignee: Mitsubishi Precision, Co., Ltd., Tokyo (JP)

( * ) Notice: Subject to any disclaimer, the term of this patent is extended or adjusted under 35 U.S.C. 154(b) by 0 days.

(21) Appl. No.: 09/355,257

(22) PCT Filed: Oct. 26, 1998

(86) PCT No.: PCT/JP98/04845

§ 371 (c)(1),
(2), (4) Date: Jul. 23, 1999

(87) PCT Pub. No.: WO99/26569

PCT Pub. Date: Jun. 3, 1999

(30) Foreign Application Priority Data

| Apr. 28, 1997 | (JP) | 9-122858 |
| Apr. 28, 1997 | (JP) | 9-122859 |
| Nov. 26, 1997 | (JP) | 9-324633 |
| Feb. 19, 1998 | (JP) | 10-052687 |

(51) Int. Cl.$^7$ ................................................ G01C 3/10
(52) U.S. Cl. ........................................ 702/94; 701/211
(58) Field of Search ................... 702/94, 95; 701/211, 701/207

(56) References Cited

U.S. PATENT DOCUMENTS 5,910,799 A * 6/1999 Carpenter et al. .......... 345/333

FOREIGN PATENT DOCUMENTS

| EP | 0338997 | 10/1989 |
| FR | 2674977 | 10/1992 |
| JP | 5-168665 | 7/1993 |
| JP | 5-220007 | 8/1993 |
| JP | 8-191853 | 7/1996 |

* cited by examiner

Primary Examiner—Marc S. Hoff
Assistant Examiner—Edward Raymond
(74) Attorney, Agent, or Firm—Paul & Paul

(57) ABSTRACT

An information service system comprises a portable unit carried by the user and an identification tag for supplying information on the present position of the user or the place where the user is approaching. The identification tag transmits the transmission information including the specified information stored in advance using infrared light or the like. The portable unit that has entered a predetermined range of the identification tag, upon receipt of the transmission information, demodulates the specified information and outputs the specified information from an information output unit such as a speaker. By the way, in the case where the specified information is an identification tag ID for specifying the particular identification tag, the portable unit selects the guide information corresponding to the identification tag ID through the portable unit controller and outputs it from the information output unit.

26 Claims, 34 Drawing Sheets

INFORMATION GUIDANCE SYSTEM

TECHNICAL FIELD

The present invention relates to an information service system, or more in particular to an information service system capable of supplying the user thereof (visually or aurally handicapped persons, aged persons and also the ordinary healthy persons) with information on their current position and on an object which they are approaching.

BACKGROUND ART

In recent years, an information service system has been proposed for supplying visually handicapped persons with the information on their present position and on the object which they are approaching.

An example is a system in which information on the present position or an object is transmitted by radio from a radio tag and the user receives the information on his present position or the object by a receiver in a portable unit carried by him.

The system for transmitting information by radio, however, lacks the directivity and therefore is not proper for supplying information on a specific direction or orientation.

Also, in a special place such as a train or a hospital, the use of radio equipment is often prohibited to avoid the adverse effect it may have on other electronic equipment. Therefore, a radio tag for information service cannot be installed in such a place.

DISCLOSURE OF THE INVENTION

In view of this, the present invention has been developed to solve the problem described above, and the object thereof is to provide an information service system which offers a higher chance of supplying the user with information and guides the user to an information source accurately without adversely affecting other electronic equipment.

According to the present invention, there is provided an information service system for supplying the user with the information on his present position or on a specific place which he is approaching, comprising a portable unit carried by the user and an ID tag installed at a specific place, wherein the ID tag includes a predetermined information storage unit for storing predetermined information, an ID tag control unit for generating the transmission information containing the predetermined information stored in the predetermined information storage unit, and an ID tag transmitter for transmitting the transmission information generated in the ID tag control unit, and wherein the portable unit includes a portable unit receiver for receiving the transmission information transmitted from the ID tag transmitter, a portable unit controller for selecting the guide information stored in advance in accordance with the transmission information received by the portable unit receiver, and a portable unit information output unit for outputting the guide information selected by the portable unit controller.

BEST MODE FOR CARRYING OUT THE INVENTION

Figure 1:
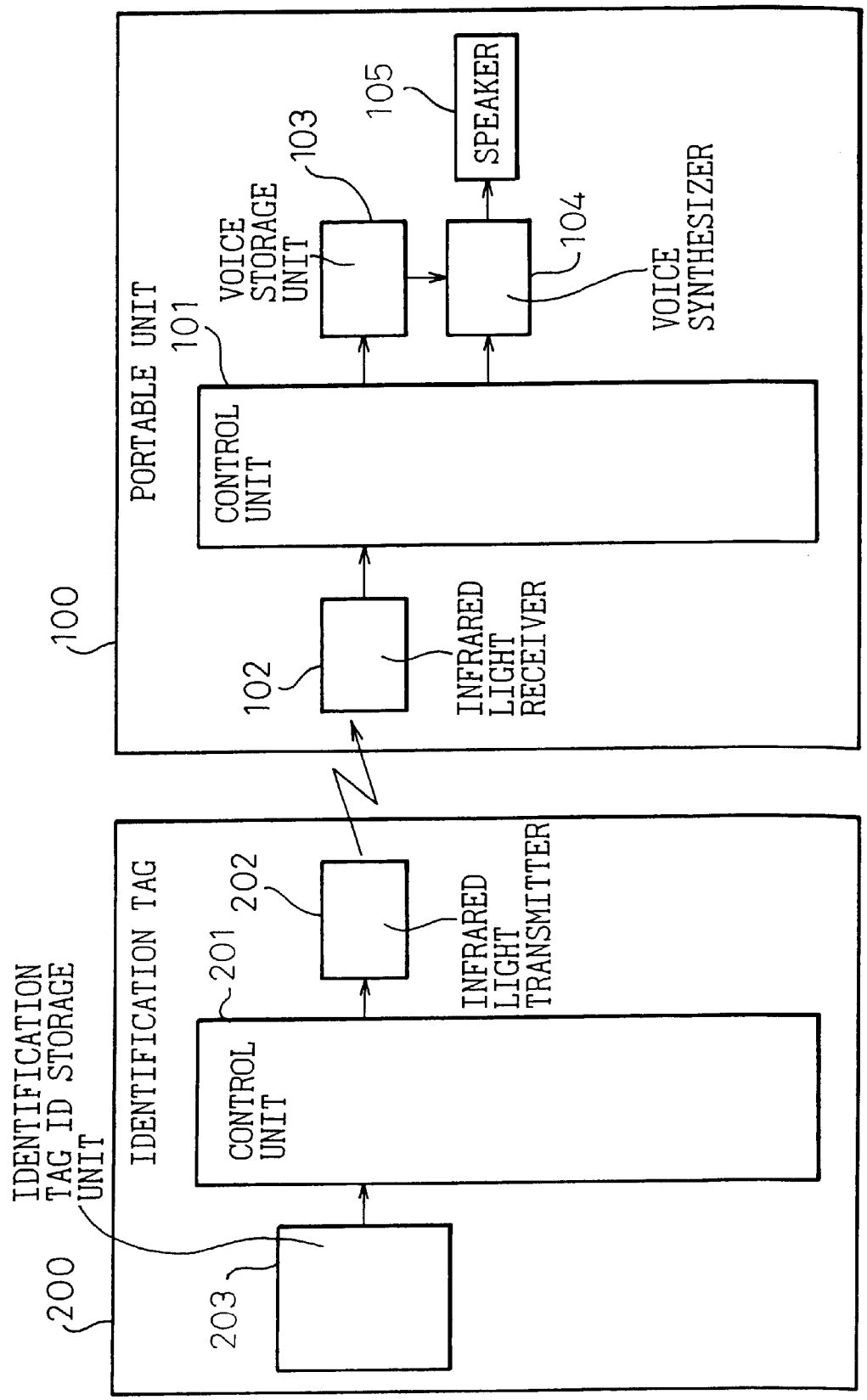
FIG. 1 is a functional diagram showing a first embodiment of the present invention.

FIG. 1 is a functional diagram showing an information service system according to a first embodiment of the present invention mainly applicable as a system for visually handicapped persons.

In FIG. 1, numeral 100 designates a portable unit carried by the user of the information service system according to the invention. Numeral 200 designates an identification tag which may be installed at predetermined places as described below.

Corridors and room entrances of public facilities such as hospitals and municipal offices Corridors or exhibition sites of art museums or museums Passages of amusement centers or entrances to facilities thereof Corridors, room entrances or racks of libraries Stands or passages of department stores, or self-service stores such as supermarkets or convenience stores Corridors, facilities and counters of railway or subway stations or airport terminals Corridors or facilities in workplaces of visually handicapped persons Residential houses of visually handicapped persons and the neighborhood thereof Predetermined places in rooms, lobbies or rest rooms of hotels Destination indication boards or entrances of buses, tram cars or taxis.

Specifically, the portable unit 100 according to the first embodiment includes a portable unit controller 101 for controlling the operation of the portable unit, an infrared light receiver 102 for receiving the infrared light signal transmitted from an identification tag 200, a voice storage unit 103 for storing predetermined voice data, a voice synthesizer 104 for converting the information transmitted from the identification tag 200 or the voice data stored in the voice storage unit 103 into a voice signal, and a speaker 105 (or an earphone) for outputting the voice signal to the outside.

The identification tag 200 according to the first embodiment, on the other hand, includes an identification tag control unit 201 for controlling the operation of the identification tag, an infrared light transmitter 202 for transmitting the infrared light signal to the portable unit 100, and an identification tag ID storage unit 203 for storing ID information (ID) unique to each identification tag.

The infrared light radiation of the infrared light transmitter 202 of the identification tag 200 can be set in a wide or narrow range in accordance with the installation site.

In the case where the identification tag 200 is installed on a stand or in a passage in a department store, a supermarket or a convenience store, for example, the radiation of the infrared light, to distinguish adjacent commodities, is set in a narrow range.

In the case where the distance between adjacent facilities is large as in an amusement park, on the other hand, the infrared light radiation can be set in a wider range. In order to widen the infrared light radiation range, a plurality of infrared light transmitters 202 can be installed in different directions of detection for each identification tag 200.

Figure 2:
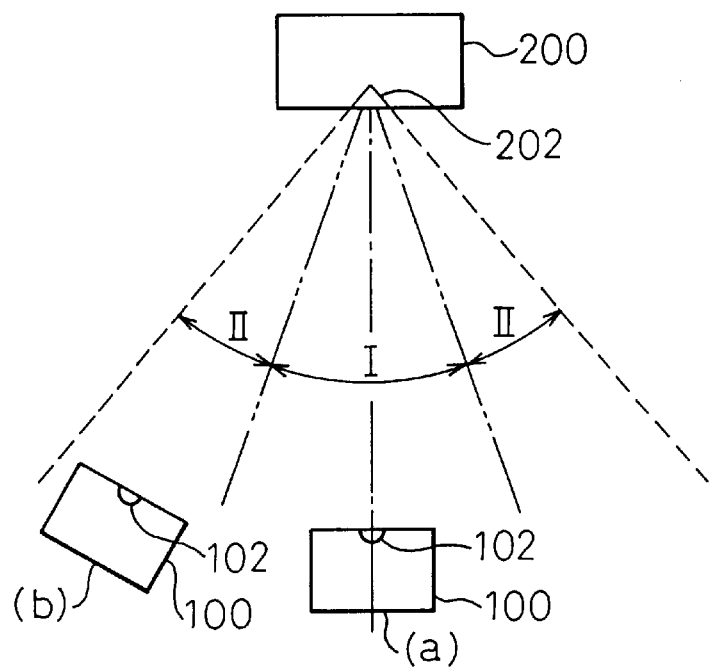
FIG. 2 is a diagram for explaining the radiation intensity range of the infrared light of an infrared light transmitter of the ID tag.

FIG. 2 is a diagram for explaining the infrared light radiation intensity range of the infrared light transmitter 202 of the identification tag 200. An area I is located with the center thereof in front of the infrared light transmitter 202 and areas II outside of the area I.

Figure 3:
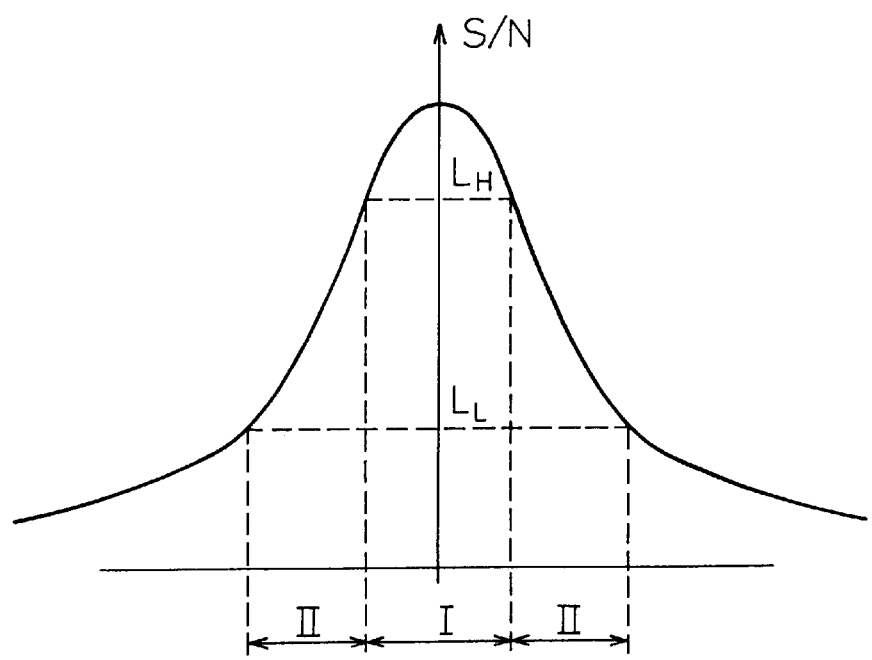
FIG. 3 is a diagram for explaining the correlation between the ability of the portable unit to receive the infrared light signal and the infrared light radiation intensity range.

FIG. 3 is a diagram for explaining the correlation between the ability of the portable unit 100 to receive the infrared light signal and the infrared light radiation intensity range. The ordinate represents the received signal-to-noise ratio (S/N ratio), and the abscissa represents the deviation from the center of the infrared light transmitter 202. Specifically, the S/N ratio is maximum at the center of the infrared light transmitter 202, and decreases with the deviation from the center.

In the case where the portable unit 100 is located in the area I, the infrared light signal transmitted from the identification tag 200 can be received by the portable unit 100 with the receiving S/N ratio of not less than LH.

In the case where the portable unit 100 exists in the areas II, on the other hand, the infrared light signal transmitted from the identification tag 200 can be received by the portable unit 100 with the receiving S/N ratio of not less than LL but not more than LH.

Figure 4:
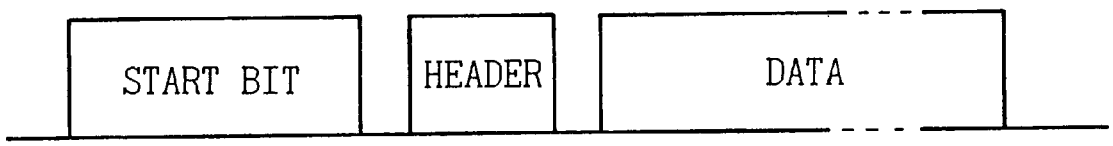
FIG. 4 is a format of the infrared light information transmitted from the ID tag.

FIG. 4 shows a format of the infrared light information transmitted from the identification tag 200 according to the invention. A header and data are transmitted following the start bits having a predetermined bit pattern. The header is used for discriminating the type of information transmitted as data. According to the first embodiment, the data is the identification tag ID stored in the identification tag ID storage unit 203, and therefore the header is set to "m".

The probability of recognizing the information is higher for the header only than for the header and data. This probability is dependent on the receiving S/N ratio of the portable unit 100.

In the case where the receiving S/N ratio of the portable unit 100 is not less than LH, it is possible to decode all the bits constituting the header and the data, while in the case where the receiving S/N ratio is not less than LL but not more than LH, only the header can be decoded.

Therefore, the portable unit 100, when located in the area I, can decode all the bits including both the header and the data. When the portable unit 100 is located in the area II, on the other hand, it can decode the header but not the data.

Specifically, in the area I, the existence of the identification tag is announced, while more detailed information can be supplied in the area II thereby giving the user a higher chance to acquire the detailed information.

Figure 5:
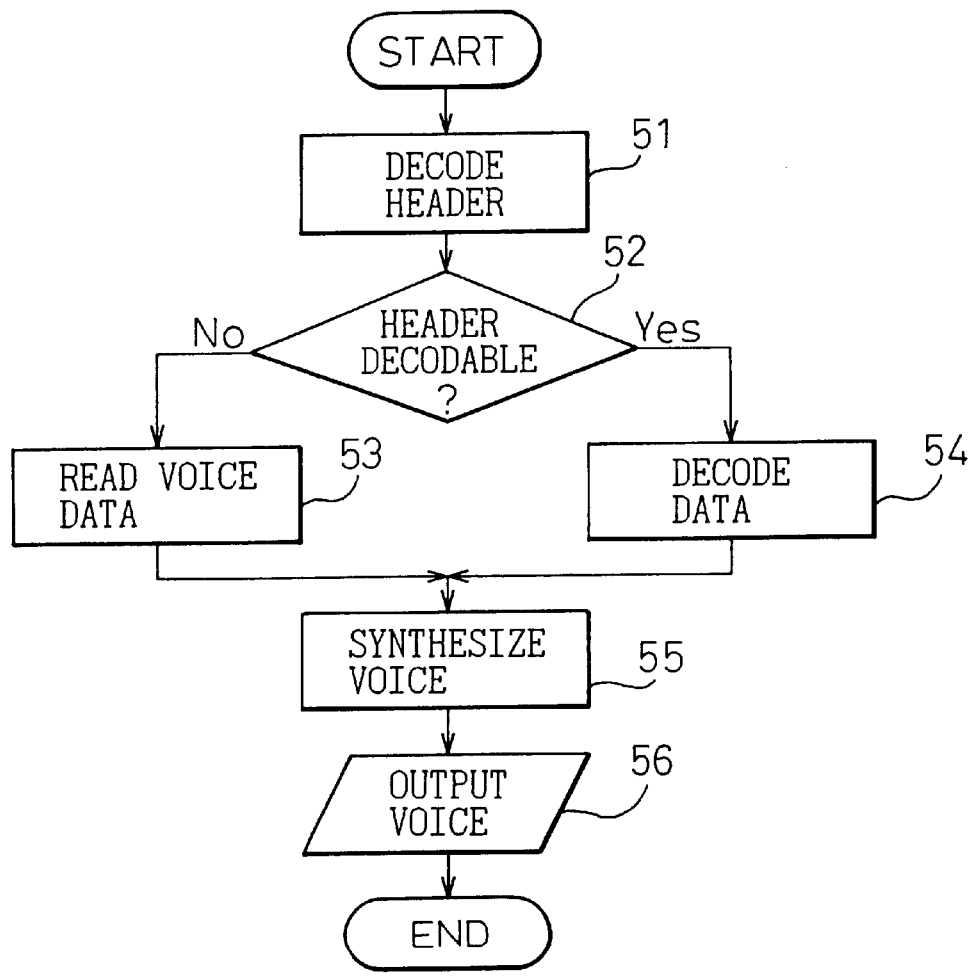
FIG. 5 is a flowchart of a first information output routine.

FIG. 5 is a flowchart for the first information output routine executed in the portable unit controller 101 of the information service system according to the first embodiment. This flowchart is executed each time the portable unit 100 receives the header transmitted from the identification tag.

In step 51, the header is decoded. Then, in step 52, it is determined whether the identification tag ID constituting the data transmitted following the header can be decoded or not.

In the case where the determination in step 52 is negative, i.e. in the case where the identification tag ID cannot be decoded, the voice data stored in the voice storage unit 103, such as the wording "The identification tag is installed. Move the portable laterally", is read out and the process proceeds to step 55.

In the case where the determination in step 52 is affirmative, in contrast, i.e. in the case where the identification tag ID can be decoded, the voice data corresponding to the identification tag ID transmitted from the identification tag 200 using the voice synthesizer 104 such as the wording "This the foot of the staircase" corresponding to the identification tag ID "BBBB" is generated in step 54, and the process proceeds to step 55.

In step 55, the voice data stored in the voice storage unit 103 or the data transmitted from the identification tag 200 is aurally synthesized and output from the speaker 105 (or the earphone) as a voice in step 56 thereby to end this routine.

In the case where the identification tag 200 is installed at the foot of the staircase, for example, the code "BBBB" indicating the foot of the staircase is set in the identification tag ID storage unit 203 as the identification tag ID information (ID#3) specifying the identification tag 200. And the portable unit 100 outputs the voice information corresponding to "BBBB", such as the wording "This is the foot of the staircase".

In similar fashion, in the case where the identification tag 200 is installed at the head of the staircase, the code "CCCC" indicating the head of the staircase is set in the identification tag ID storage unit 211 as the identification tag ID information (ID#3). In this case, the use of the identification tag ID information (ID#3) different from the one for the foot of the staircase described above permits the portable unit 100 to output the voice information different from the one for the foot of the staircase, such as the wording "This is the head of the staircase".

Figure 6:
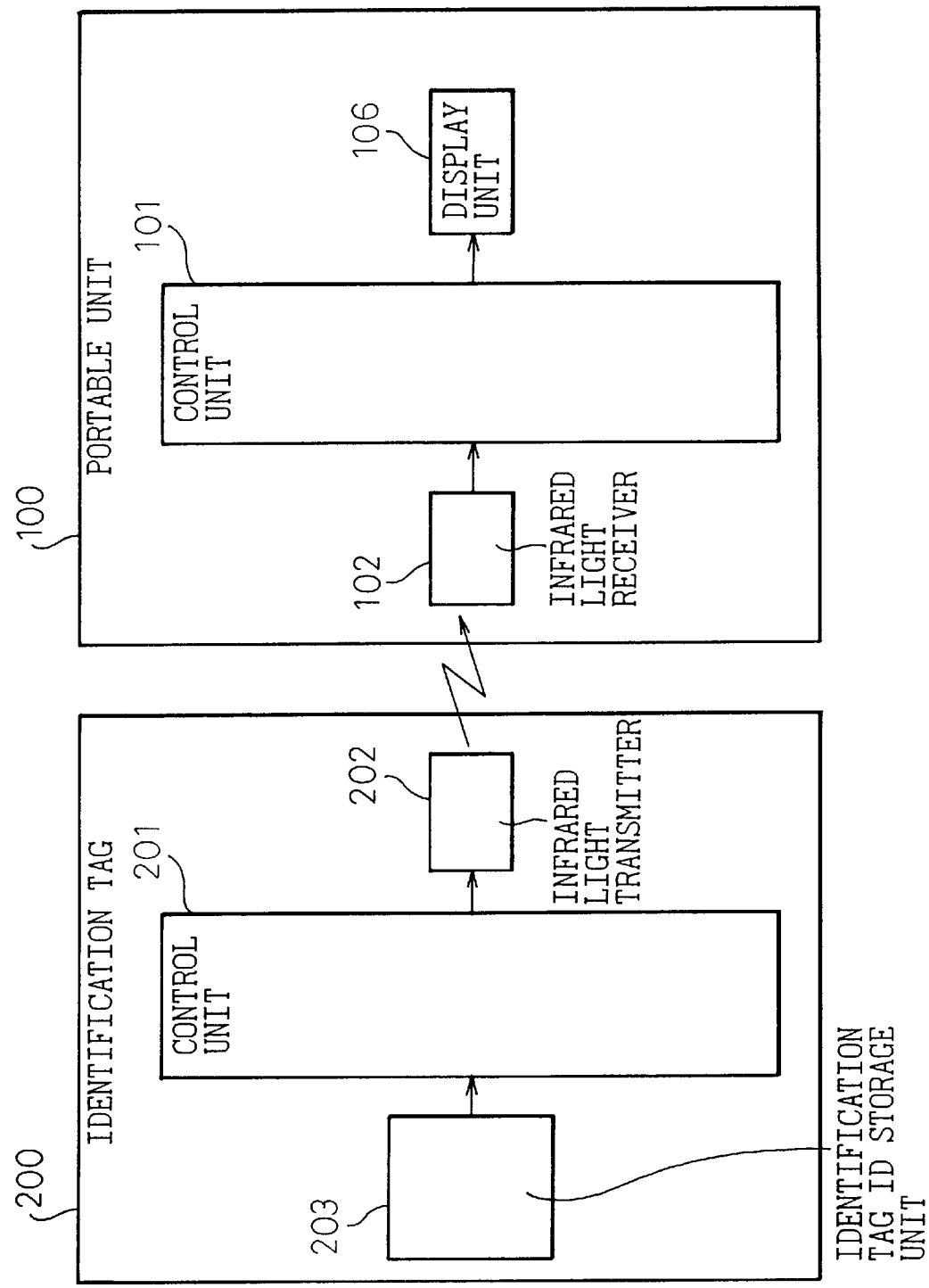
FIG. 6 is a functional diagram showing a second embodiment of the invention.

FIG. 6 is a functional diagram showing an information service system according to a second embodiment of the invention. This system is primarily for aurally handicapped persons, and uses a display unit 106 which is a liquid crystal display, for example, in place of the speaker 105. The data transmitted from the identification tag 200 is displayed on the display unit 106 as text information.

Figure 7:
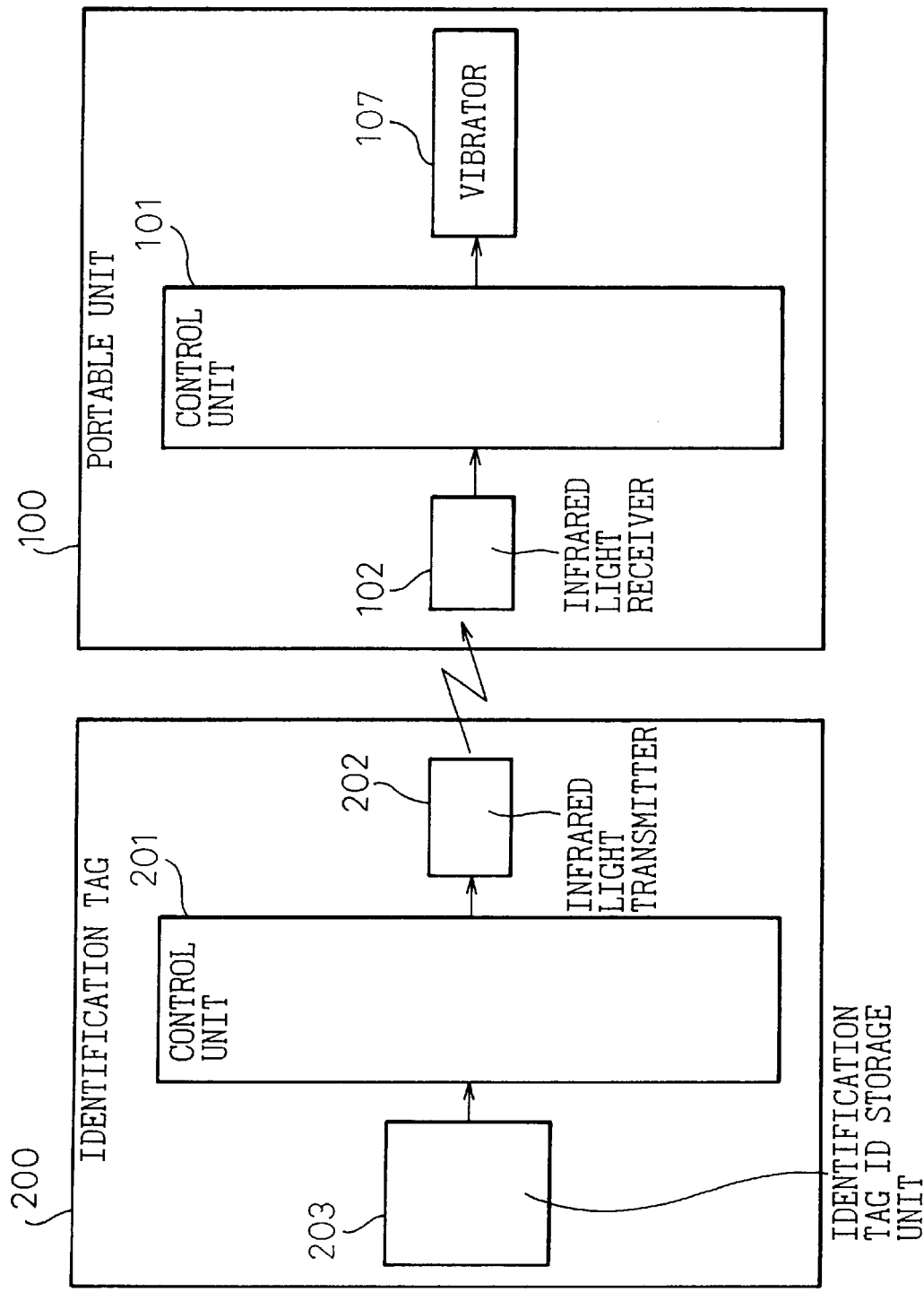
FIG. 7 is a functional diagram showing a third embodiment of the invention.

FIG. 7 is a functional diagram showing an information service system according to a third embodiment of the invention, in which a vibrator 107 is connected to the portable unit controller 101. The user is informed by vibrations that the portable unit 100 has received the header.

According to this embodiment, even in the case where the user is an aurally handicapped person, or in the case where he is located in a noisy place, he can be informed of the existence of the identification tag.

Figure 8:
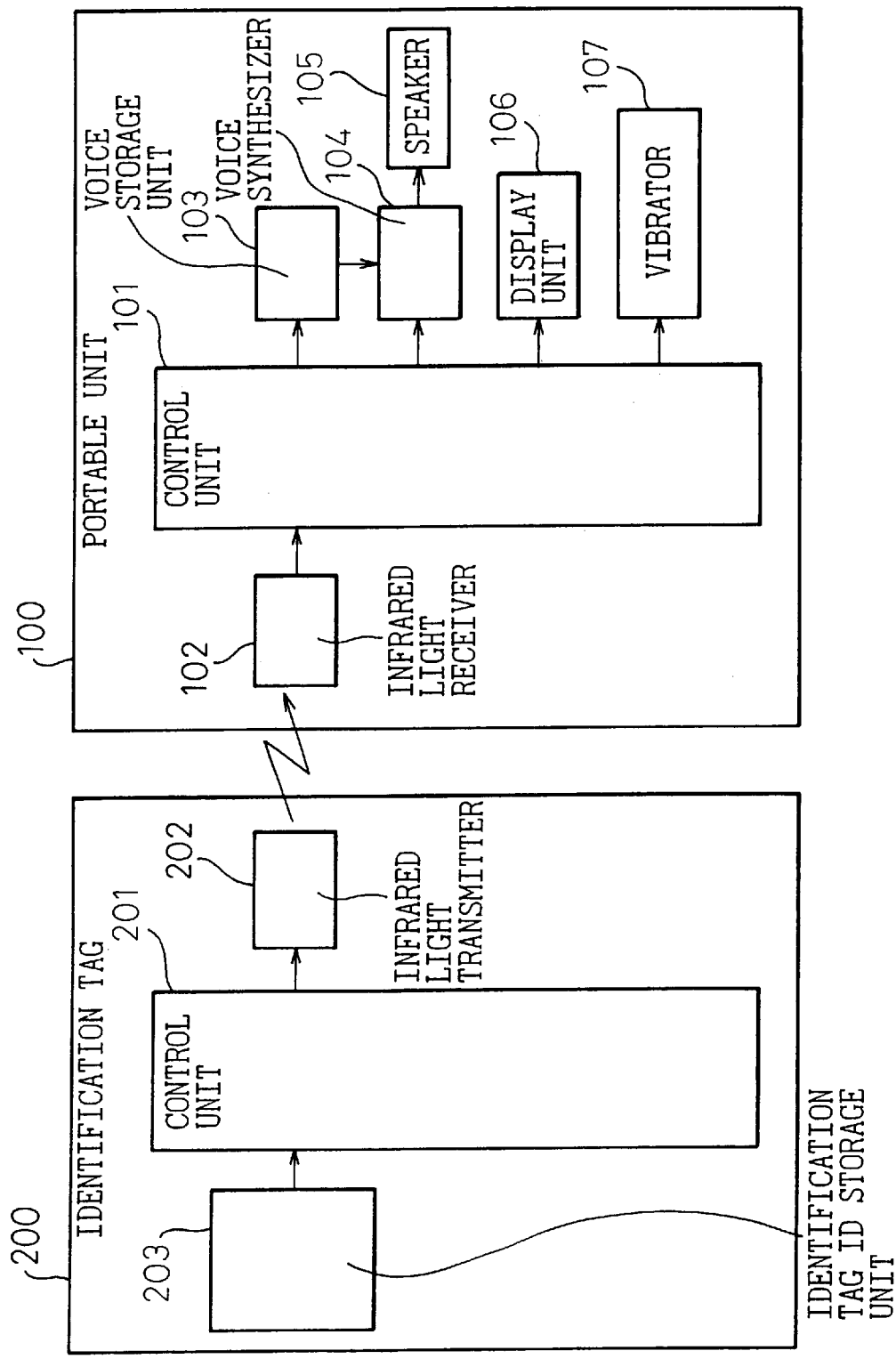
FIG. 8 is a functional diagram showing a fourth embodiment of the present invention.

FIG. 8 is a functional diagram of an information service system according to a fourth embodiment of the invention, which comprises all the information output means including the speaker 105 (or the earphone), the display unit 106 and the vibrator 107.

Figure 9:
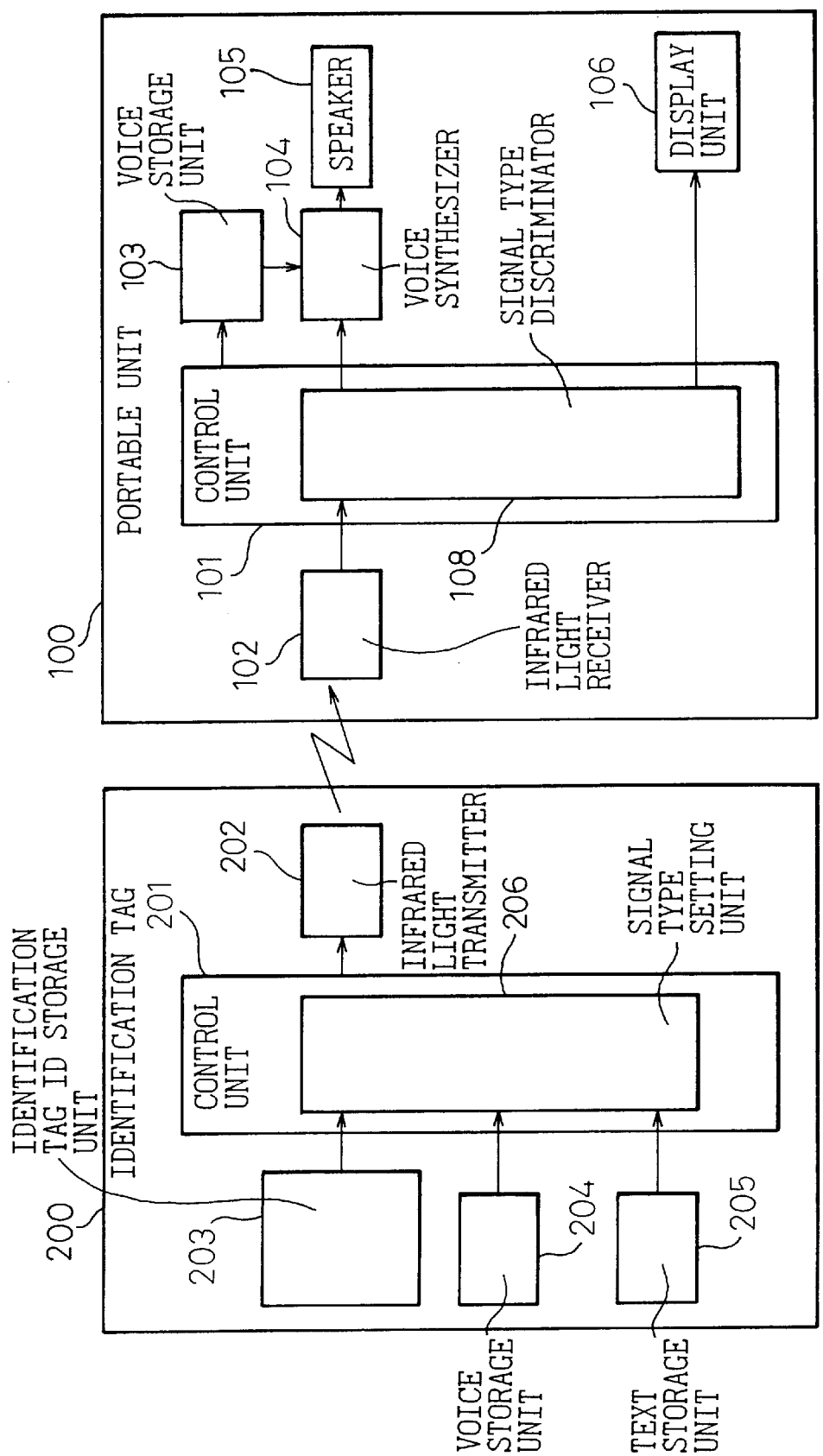
FIG. 9 is a functional diagram showing a fifth embodiment of the invention.

FIG. 9 is a functional diagram showing an information service system according to a fifth embodiment of the invention. In the first to fourth embodiments, the voice data corresponding to the identification tag ID is required to be stored in the portable unit 100, and therefore a long message cannot be stored. According to this embodiment, this point is improved so that arbitrary information can be set in the identification tag 200.

Specifically, according to this embodiment, the identification tag 200 additionally includes a voice storage unit 203 for storing arbitrary information as voice information, a text storage unit 205 for storing arbitrary information as text information and a signal type setting unit 206 for changing the header in accordance with the type of the signal transmitted.

Further, the portable unit 100, in addition to the voice storage unit 103, the voice synthesizer 104, a speaker 105 and the display unit 106, includes a signal type discriminator 108 in the portable unit controller 101.

The signal type setting unit 206 in the identification tag 200 has the function of changing the header in accordance with the transmission signal. The header is set to "m" when transmitting the identification tag ID stored in the identification tag ID storage unit 203, to "n" when transmitting the voice information stored in the voice storage unit 204, and to "p" when transmitting the text information stored in the text storage unit 205.

The signal type discriminator 108 in the portable unit 100 has the function of determining the type of the received signal, and decides that the identification tag ID has been received when the header is "m", the voice information has been received when the header is "n", and that the text information has been received when the header is "p". The voice information is output from the speaker 105 (or the earphone) and the text information from the display unit 106.

Figure 10:
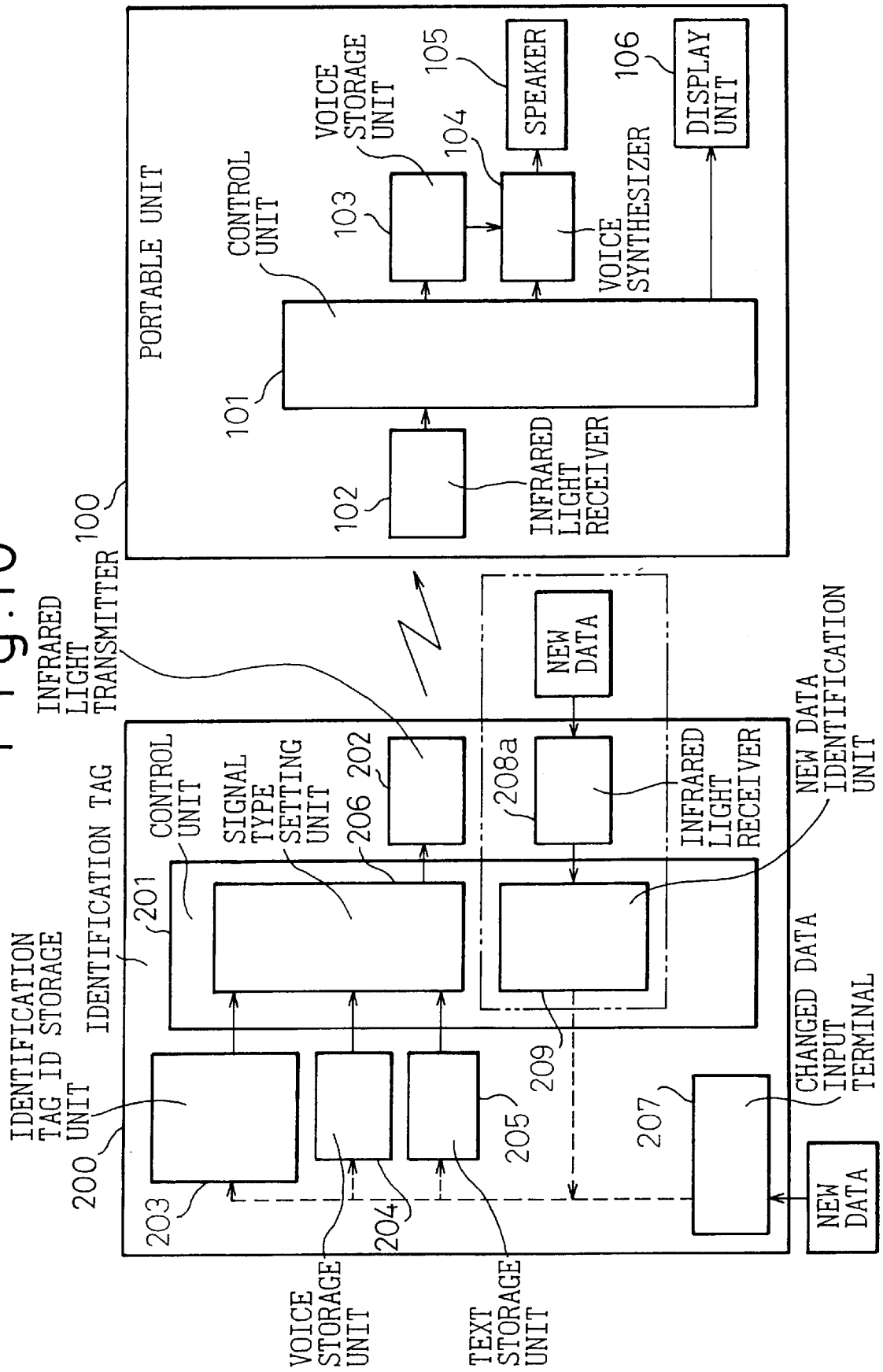
FIG. 10 is a functional diagram showing a sixth embodiment of the present invention.

FIG. 10 is a functional diagram showing a sixth embodiment, which further has the function of changing the information stored in the identification tag 200.

Specifically, a new data input terminal 207 is added in order to change the data stored in the identification tag ID storage unit 203, the voice storage unit 204 and the text storage unit 205 in the identification tag 200. The new data are input from a personal computer (not shown), for example.

Also, an infrared light receiver 208a and a new data identifier 209 can be installed in the identification tag 200 to input the new data through the infrared light receiver 208*a*. By the way, the infrared receiver 208*a* can double as the infrared light receiver described later for receiving the signal transmitted from the portable unit 100.

Figure 11:
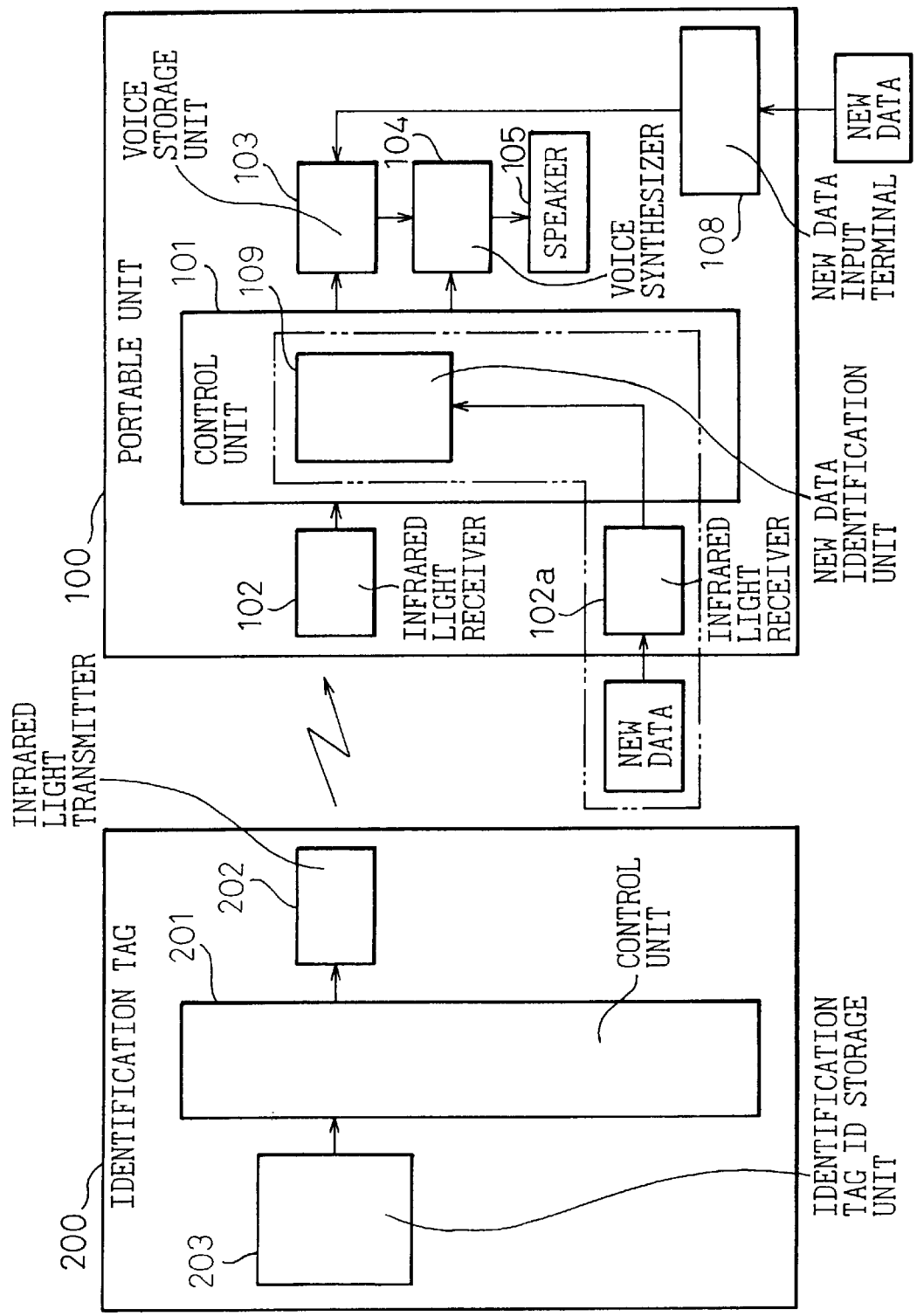
FIG. 11 is a functional diagram showing a seventh embodiment of the invention.

FIG. 11 is a functional diagram showing an information service system according to a seventh embodiment of the invention, which additionally includes the function of changing the information stored in the portable unit 100.

Specifically, a new data input terminal 108 is added for changing the data stored in the voice storage unit 103 in the portable unit 100, and the new data are input from a personal computer (not shown), for example.

Also, a second infrared light receiver 102*a* and a new data identifier 109 can be installed in the portable unit 100 to input the new data through the second infrared light receiver 102*a*. By the way, the second infrared light receiver 102*a* can double as the infrared light receiver 102.

Figure 12:
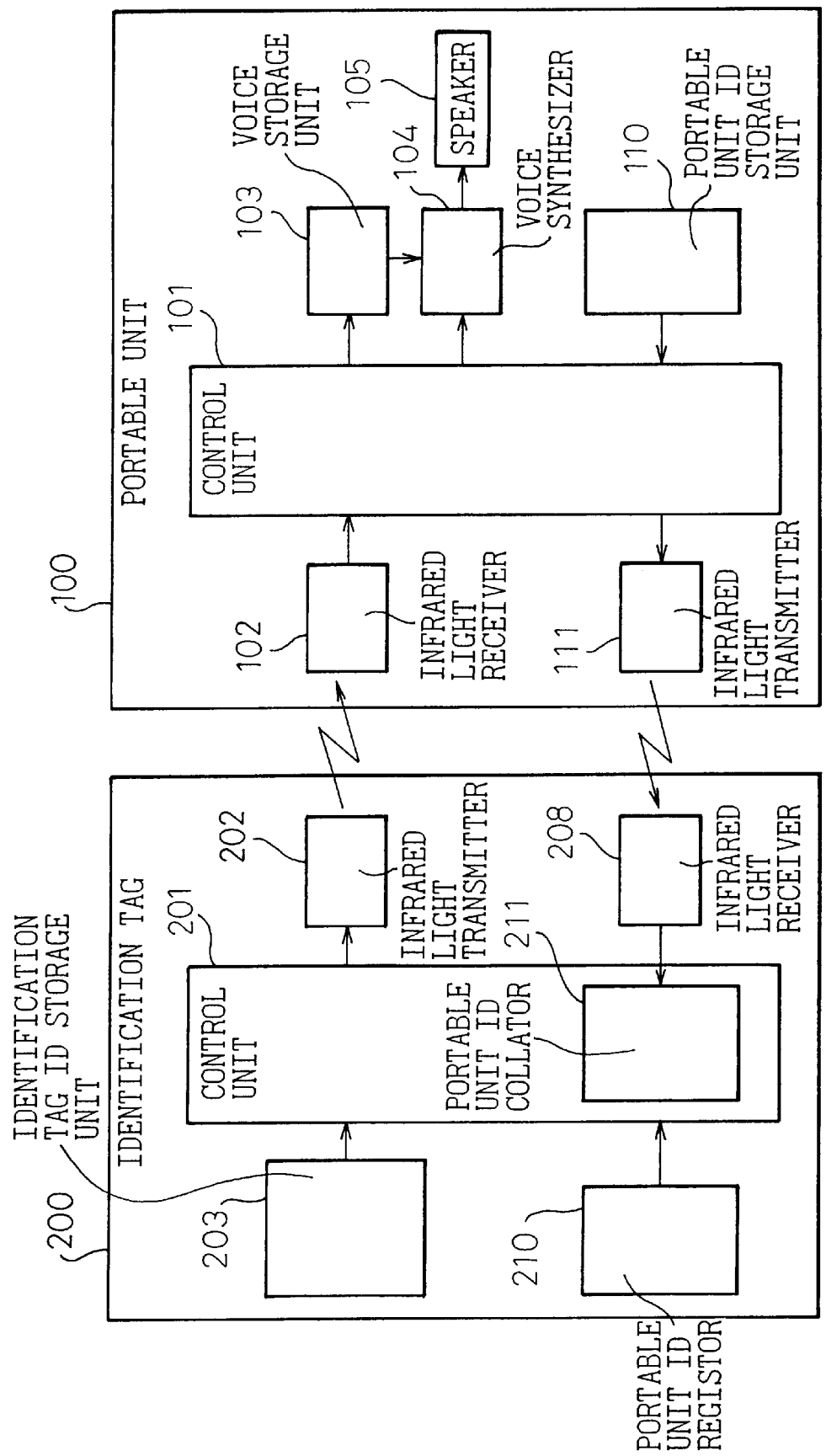
FIG. 12 is a functional diagram showing an eighth embodiment of the present invention.

FIG. 12 is a functional diagram showing an information service system according to an eighth embodiment of the invention, which further includes the function of transmitting a signal only to the portable unit 100 registered in the identification tag 200.

Specifically, the portable unit 100 according to the eighth embodiment, in addition to the portable unit controller 101 for controlling the whole operation of the portable unit, the infrared light receiver 102 for receiving the infrared light signal transmitted from the identification tag 200, the voice storage unit 103 for storing predetermined voice data, the voice synthesizer 104 for converting the information transmitted from the identification tag 200 or the voice data stored in the voice storage unit 103 into a voice signal and the speaker 105 (or earphone) for outputting the voice signal to the outside, includes therein a portable unit ID storage unit 110 for storing ID information (ID) unique to the particular portable unit and an infrared light transmitter 111 for transmitting a signal to the identification tag 100.

The identification tag 200 according to the eighth embodiment, on the other hand, in addition to the identification tag control unit 201 for controlling the whole operation of the identification tag, the infrared light transmitter 202 for transmitting an infrared light signal to the portable unit 100 and the identification tag ID storage unit 203 for storing the ID information (ID) unique to each identification tag, includes an infrared light receiver 208 for receiving the signal transmitted from the portable unit, a portable unit ID register 210 for storing the portable unit ID registered and a portable unit ID collator 211 for collating the portable unit ID in the identification tag control unit 201.

In this embodiment, when the identification tag 200 is installed in the user's seat at his working place, for example, "AAAA" is set in the identification tag ID storage unit 211 as the identification tag ID information (ID#3). Then, the portable unit 100 can receive "AAAA" and output corresponding voice information, for example, the wording "This is my seat in my work-place".

Thus, a specified person using a particular seat can receive the information service with the portable unit ID information (ID#1) unique to him as a key. Thus, it is possible to supply confidential information while protecting the privacy and interests of individuals.

The portable unit ID information (ID#1) can also be set to an ID indicating "a call request" and the identification tag ID information (ID#3) to an ID indicating "a called party", in which case the portable unit can be used for calling an individual at the counter of a hospital or a municipal office.

Figure 13:
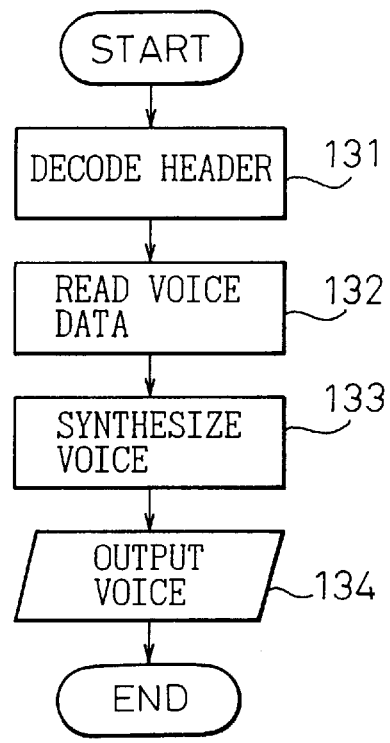
FIG. 13 is a flowchart for an instruction output routine.

FIG. 13 is a flowchart for the instruction output routine executed by the portable unit controller 101 of an information service system according to an eighth embodiment. This flowchart is executed each time the portable unit 100 receives the header transmitted from the identification tag.

The header is decoded in step 131. Then, in step 132, the voice data output at the time of receiving the header stored in the voice storage unit 103, such as the wording "The identification tag is installed. Transmit the portable unit ID information." is read out.

The voice data stored in the voice storage unit 103 is aurally synthesized in step 133, followed by step 134 for outputting it as a voice from the speaker 105 (or the earphone) thereby to end the routine.

Figure 14:
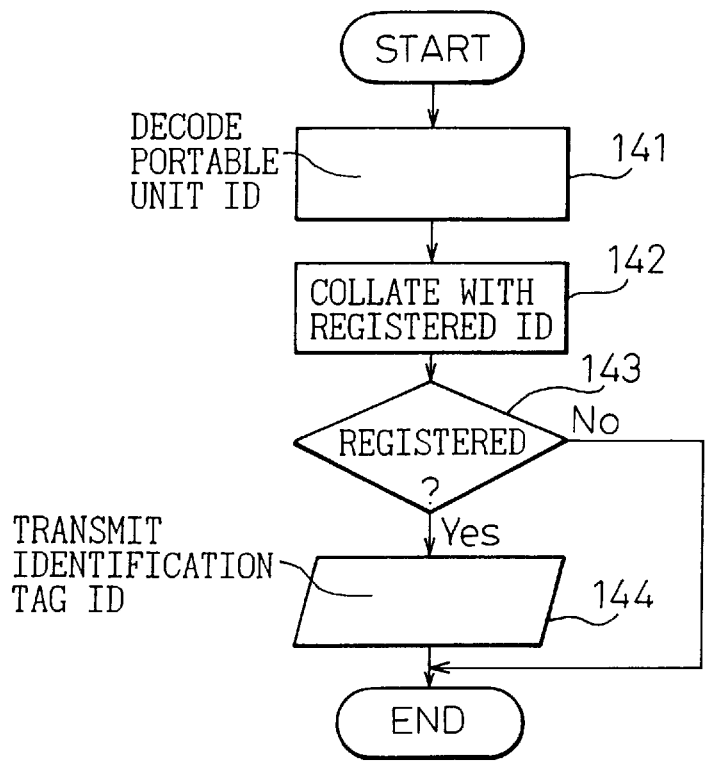
FIG. 14 is a flowchart for a first ID tag transmission routine.

FIG. 14 is a flowchart for the first identification tag transmission routine executed in the identification tag control unit 201 of an information service system according to the eighth embodiment. When the identification tag receives the portable unit ID transmitted from the portable unit, the flowchart begins to be executed.

In step 142, the portable unit ID is decoded, and in step 142, the decoded portable unit ID is checked with the portable unit ID registered in the portable unit ID register 210 by the portable unit ID collator 211.

In step 143, it is determined whether the portable unit that has transmitted the portable unit ID has been registered or not, and if registered, the identification tag ID is transmitted through the infrared light transmitter 202 in step 144 thereby to end the routine.

In the case where the determination is negative in step 143, i.e. in the case where the portable unit is not registered, on the other hand, the routine is ended as it is, or after transmitting the information in the wording "Your portable unit is yet to be registered".

Figure 15:
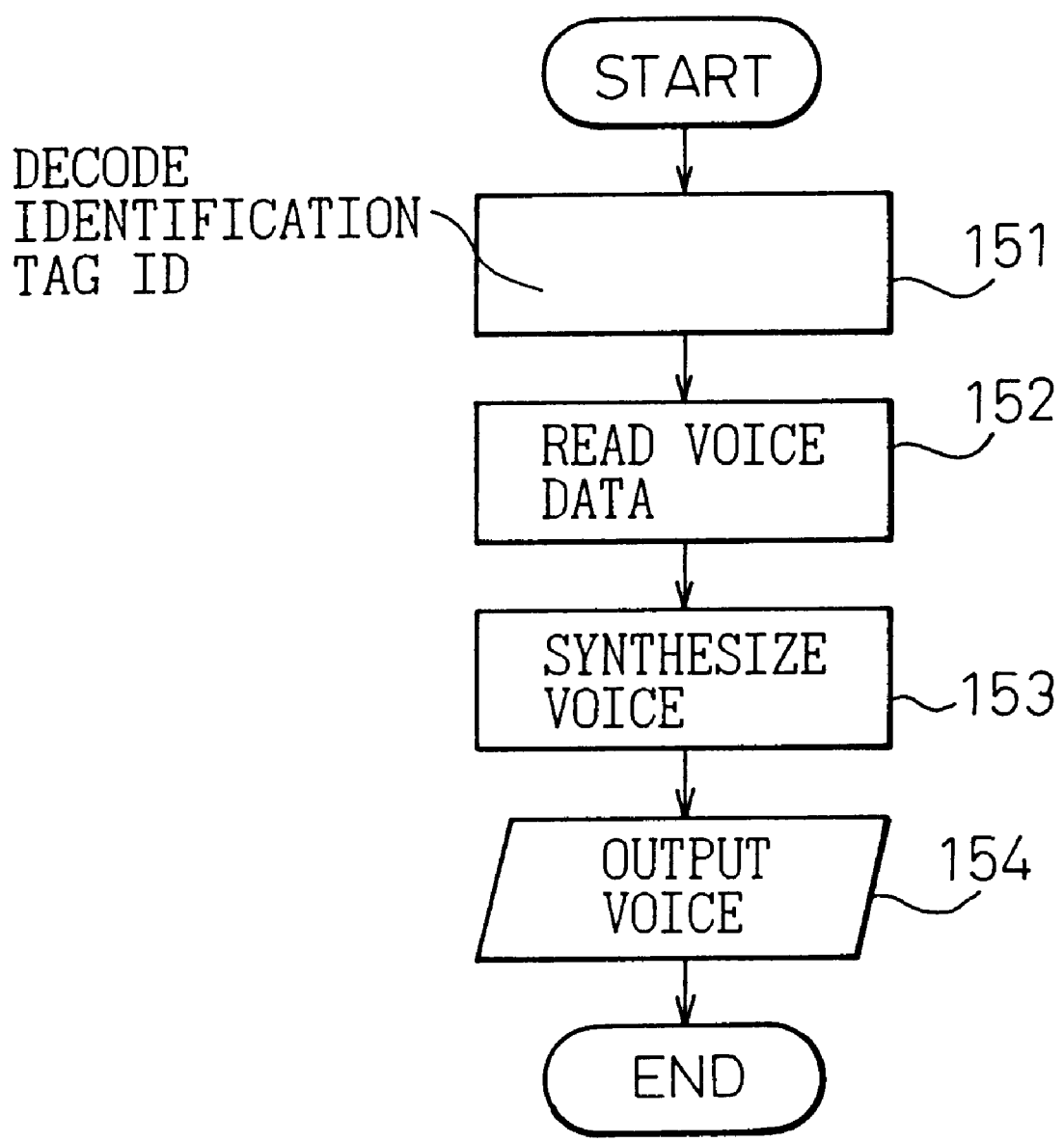
FIG. 15 is a flowchart for a second information output routine.

FIG. 15 is a flowchart for the second information output routine executed in the portable unit controller of an information service system according to the eighth embodiment, which routine begins to be executed when the portable unit 100 receives the identification tag ID transmitted from the identification tag.

In step 151, the identification tag ID is decoded. Then, in step 152, if the voice data at the time of receiving the identification tag ID stored in the voice storage unit 103 is the identification tag ID "BBBB", for example, the wording "This is the foot of the staircase" is read out.

In step 153, the voice data is aurally synthesized, followed by step 154 for outputting it as a voice from the speaker 105 (or the earphone) thereby to end the routine.

Figure 16:
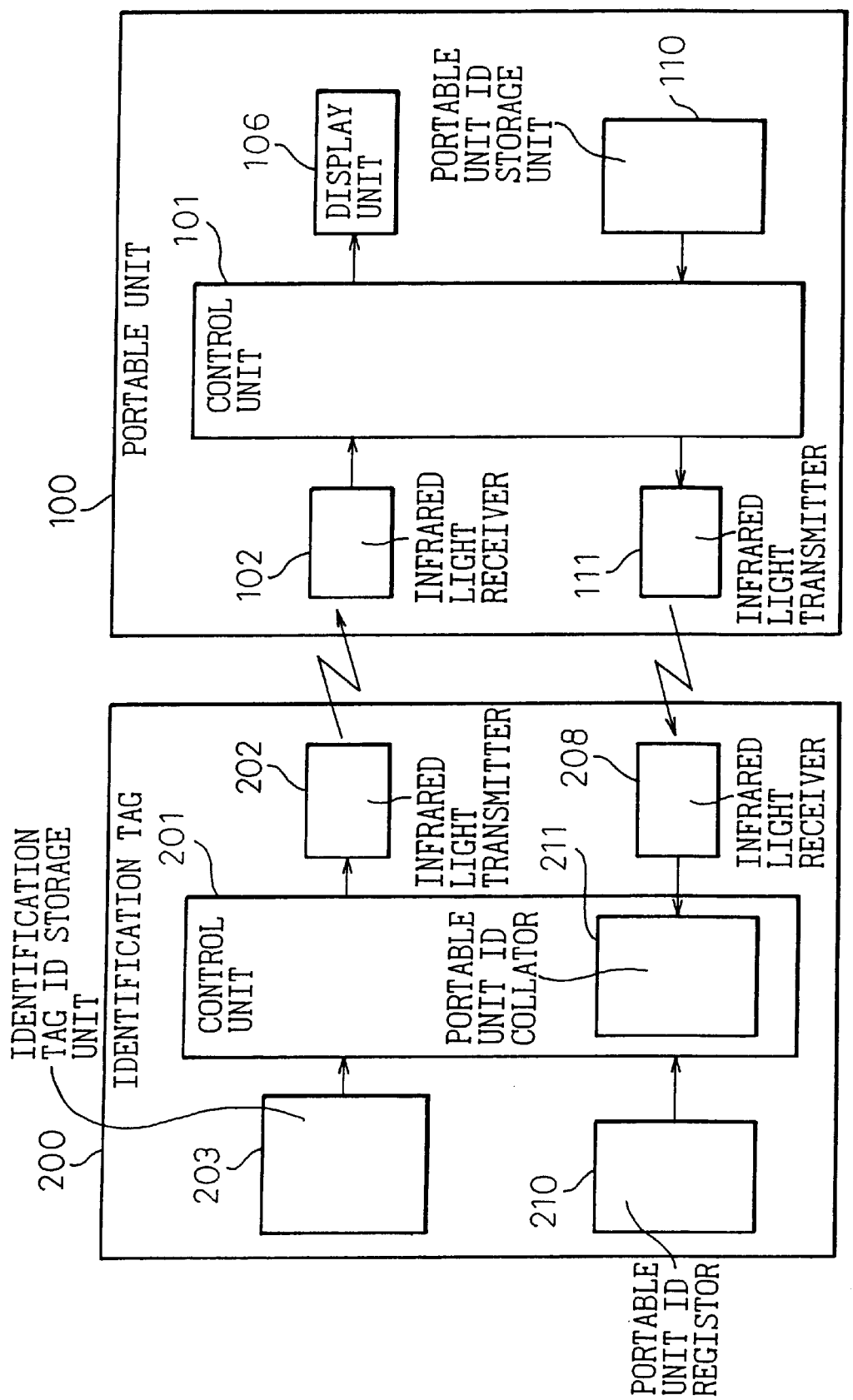
FIG. 16 is a functional diagram showing a ninth embodiment of the invention.

FIG. 16 is a functional diagram showing a ninth embodiment, in which the speaker 105 of the eighth embodiment is replaced by a display unit 106 constituting a liquid crystal display, for example, so that the data transmitted from the identification tag 200 is displayed as text information on the display unit 106.

Figure 17:
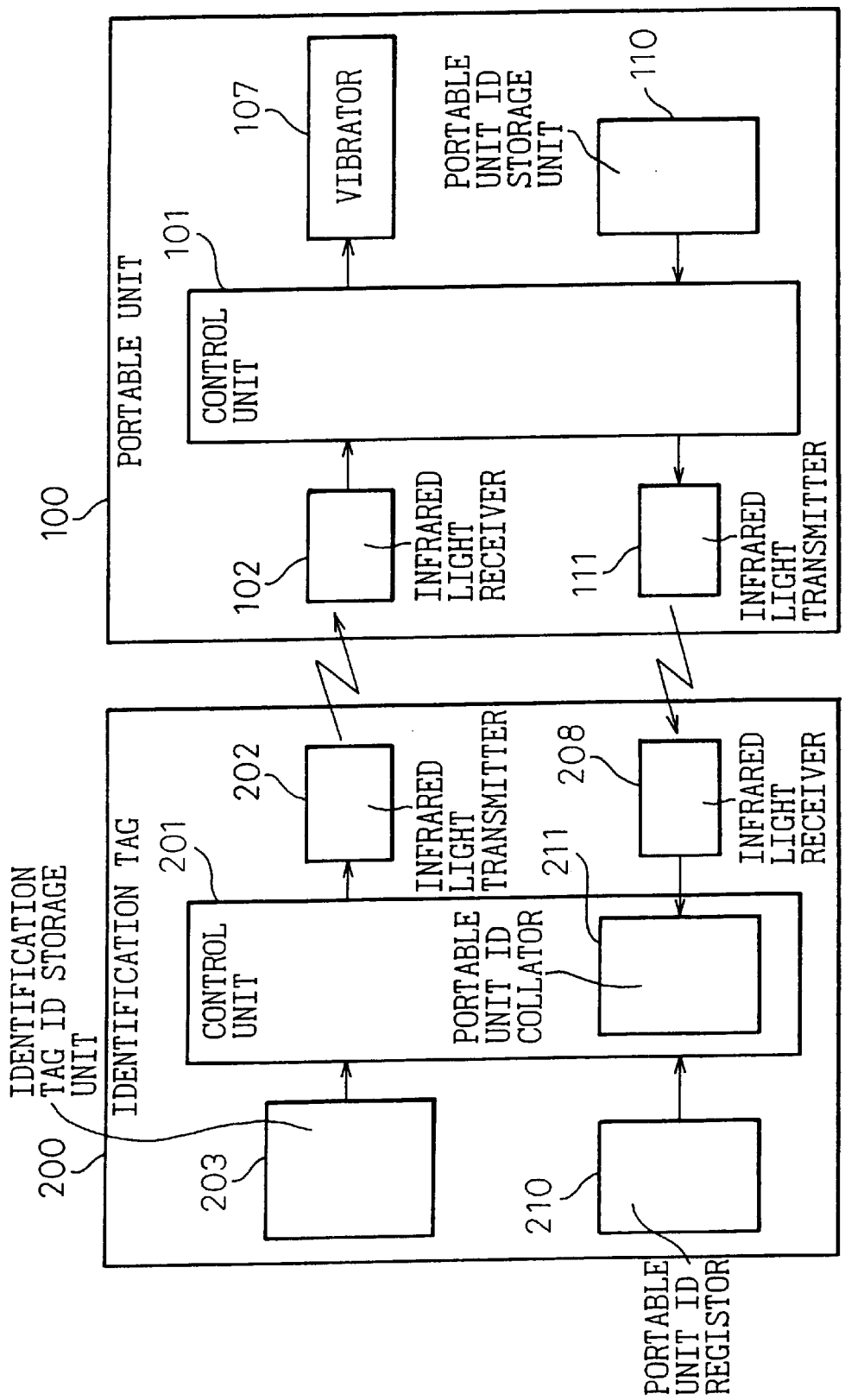
FIG. 17 is a functional diagram showing a tenth embodiment of the present invention.

FIG. 17 is a functional diagram showing a tenth embodiment, in which a vibrator 107 is connected to the portable unit controller 101 instead of the speaker 105 of the eighth embodiment.

Figure 18:
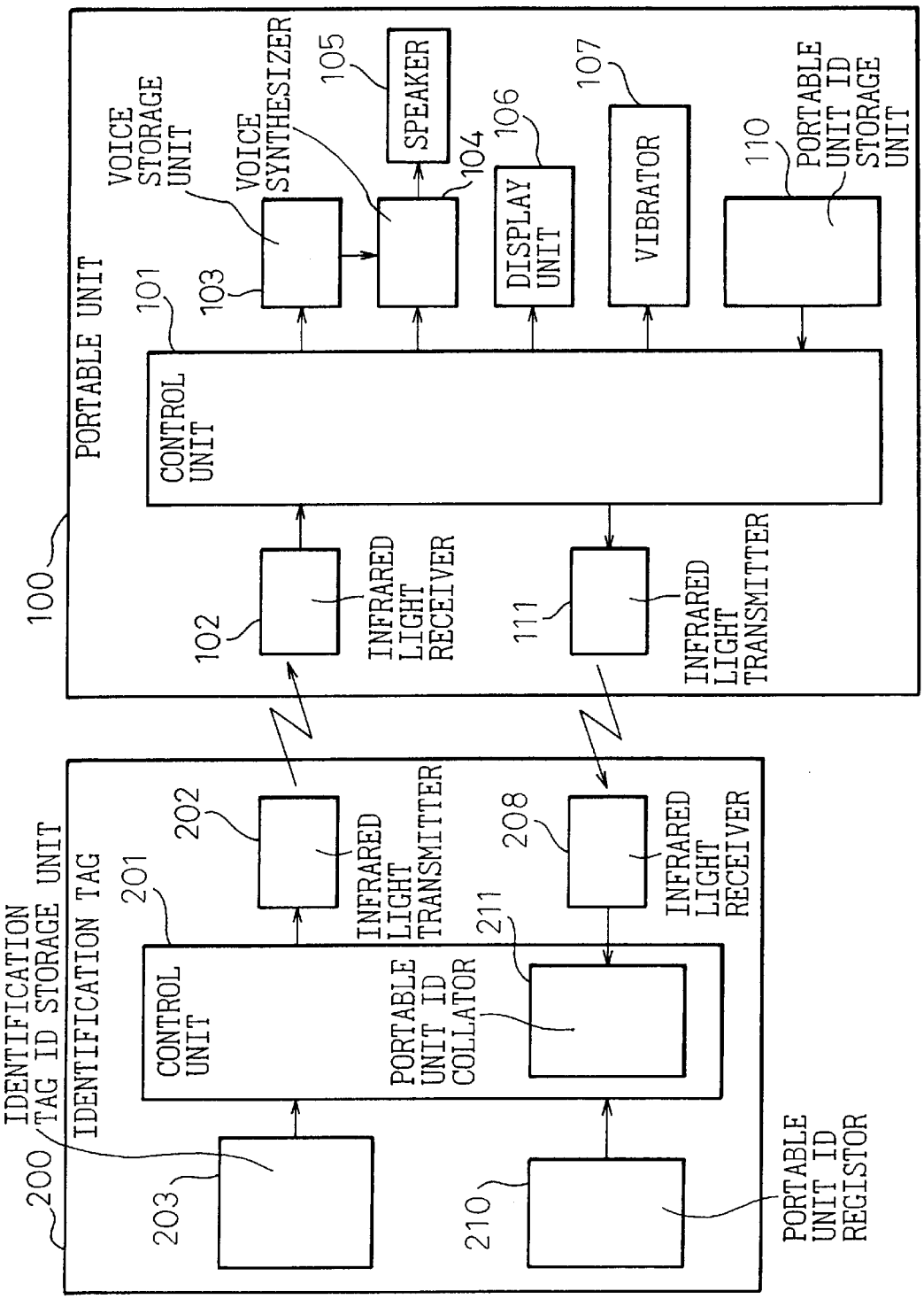
FIG. 18 is a functional diagram showing an 11th embodiment of the invention.

FIG. 18 is a functional diagram showing an 11th embodiment, in which the portable unit 100 has all the information output means including the speaker 105 (or the earphone), the display unit 106 and the vibrator 107.

Figure 19:
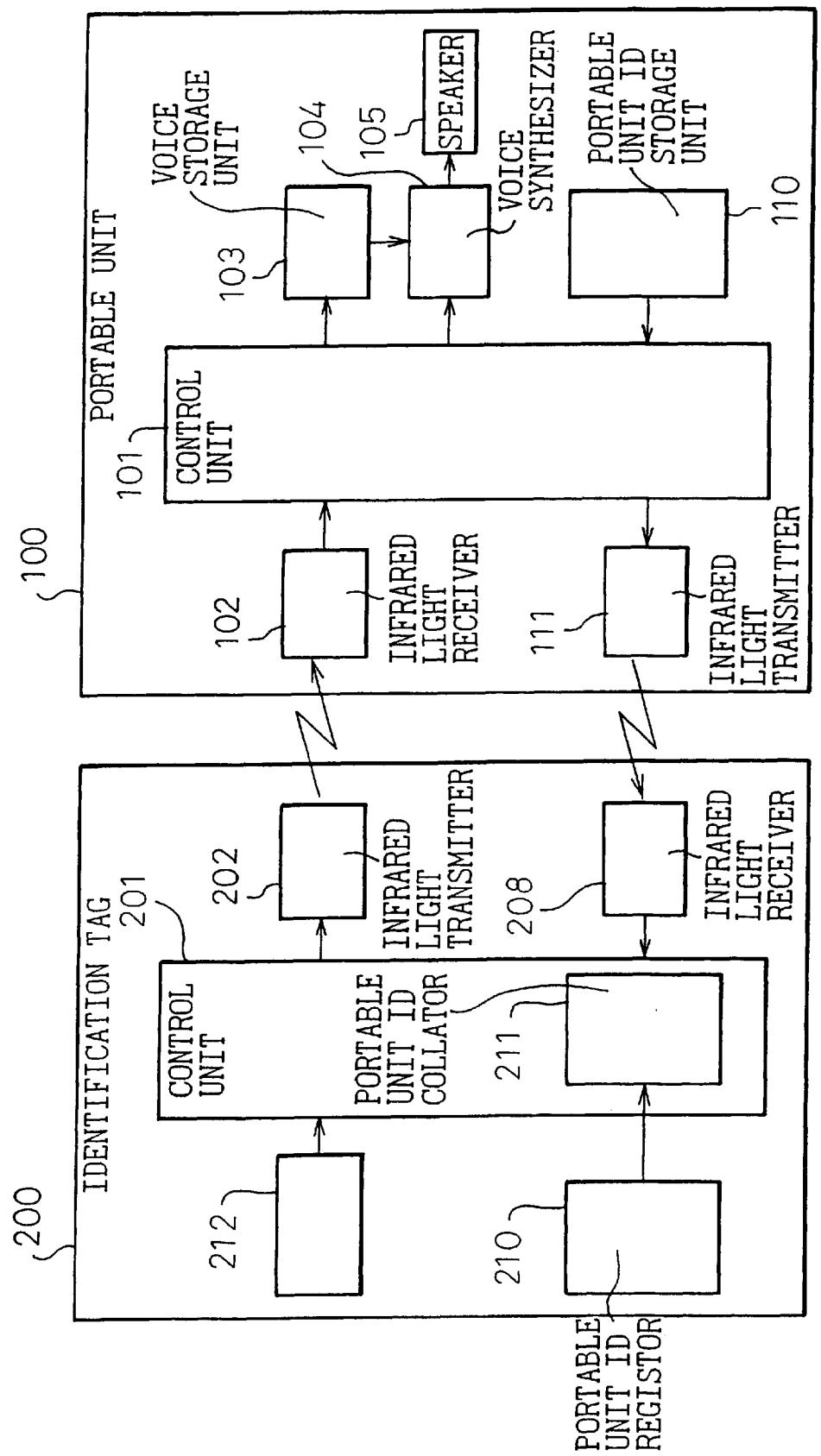
FIG. 19 is a functional diagram showing a 12th embodiment of the present invention.

FIG. 19 is a functional diagram of a 12th embodiment, in which predetermined information set in advance can be transmitted instead of the identification tag ID from the identification tag.

Specifically, the identification tag 200 according to this embodiment includes a predetermined information storage unit 212 for storing predetermined information set in advance in place of the identification tag ID storage unit 203.

In the portable unit 100 according to this embodiment, the portable unit ID transmission routine shown in FIG. 13 is executed first.

Figure 20:
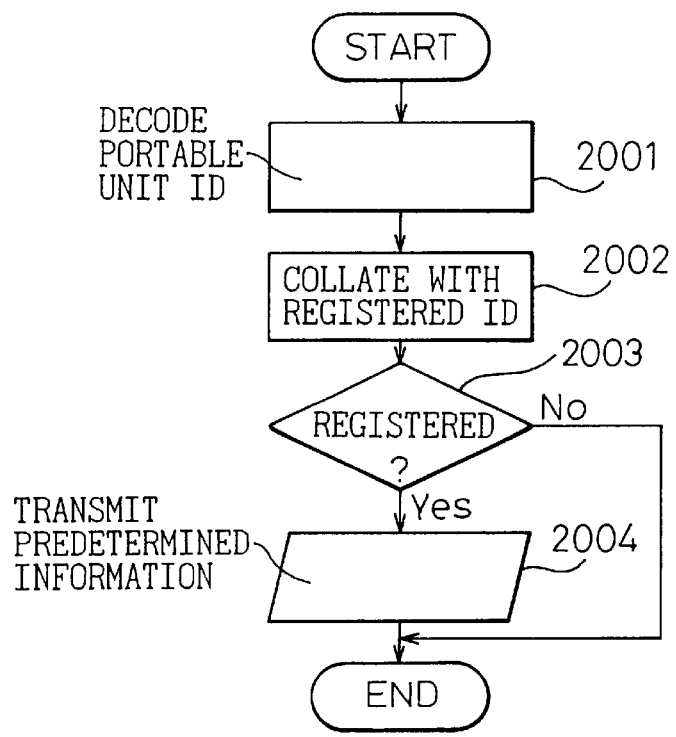
FIG. 20 is a flowchart for a second ID tag transmission routine.

FIG. 20 is a flowchart for the second identification tag transmission routine executed in the identification tag control unit 201 of the information service system according to the 12th embodiment, in which the execution is started when the identification tag receives the portable unit ID transmitted from the portable unit.

In step 2001, the portable unit ID is decoded, and in step 2002, the decoded portable unit ID is collated with the portable ID already registered in the portable unit ID register 210 by the portable unit ID collator 211.

In step 2003, it is determined whether the portable unit that has transmitted the portable unit ID is already registered, and if registered, the predetermined information stored in the predetermined information storage unit 212 is transmitted through the infrared light transmitter 202 in step 2004 thereby to end the routine.

In the case where the determination is negative in step 2003, on the other hand, i.e. in the case where the portable unit is not registered, the routine is ended as it is or after transmitting the information to the effect that "Your portable unit is not yet registered".

Figure 21:
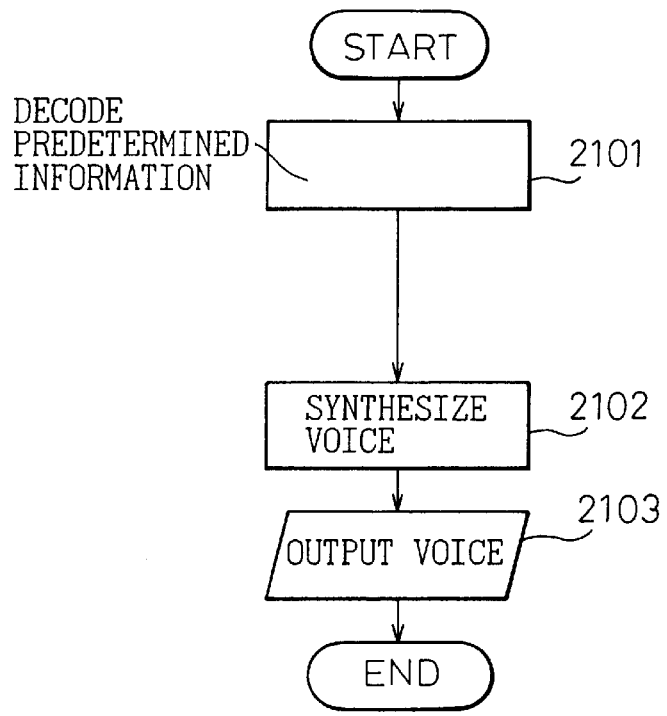
FIG. 21 is a flowchart for a third information output routine.

FIG. 21 is a flowchart for the third information output routine executed in the portable unit controller 101 of an information service system according to the 12th embodiment, in which the execution is started when the portable unit 100 receives the predetermined information transmitted from the identification tag.

In actual use, the portable unit 100 carried by Mr. Sato is assigned "1111" indicating the person of Mr. Sato as the portable unit ID information (ID#1) for identifying the particular portable unit, which code is stored in the portable unit ID storage unit 110. During the use of the portable unit 100 by Mr. Sato, the code "1111" is transmitted from the portable unit 100 toward the identification tag 200. The identification tag 200, upon receipt of the code "1111", collates it with the portable unit ID information (ID#2) "1111 (registered)" registered in the portable unit ID register 211. Since they coincide with each other in this case, a signal containing the predetermined information such as the voice information is transmitted toward the portable unit 100 carried by Mr. Sato.

In similar fashion, in the portable unit 100 carried by Mr. Suzuki, the code "2222" indicating the person of Mr. Suzuki is assigned as the portable unit ID information (ID#1) for identifying the particular portable unit, and is stored in the portable unit ID storage unit 110. The use of portable ID information (ID#1) different from that for Mr. Sato makes it possible to receive it as positively distinguished information. In the case where "2222" is not yet registered in the portable unit ID register 204 of the identification tag 200, the portable unit ID information (ID#1) transmitted from the portable unit fails to coincide with the portable unit ID information (ID#2) registered in the identification tag. Therefore, the predetermined information such as the voice information is not transmitted or, an error message indicating "unregistered" is transmitted toward the portable unit 100 carried by Mr. Suzuki.

The ID information (ID#1) for identifying the portable unit 100 is an ID such as a password number (password). In other words, only the users in registration can obtain the predetermined information such as the voice information.

In the case where a plurality of identification tags 200 are installed in proximity to each other in the embodiments mentioned above, in order to avoid interference in the portable unit 100, the transmission power or the shape along the radiation beam width of each identification tag 200 is adjusted appropriately. At the same time, adjustment is made not to overlap the transmission time between the identification tags. As a result, even when a plurality of information are received in the portable unit 100, they can be identified and the information of the top priority identification tag 200 can be output.

In step 2101, the predetermined information is decoded. Next, in step 2102, the predetermined information is aurally synthesized, followed by step 2103 for outputting a voice from the speaker 105 (or the earphone) thereby to end the routine.

Figure 22:
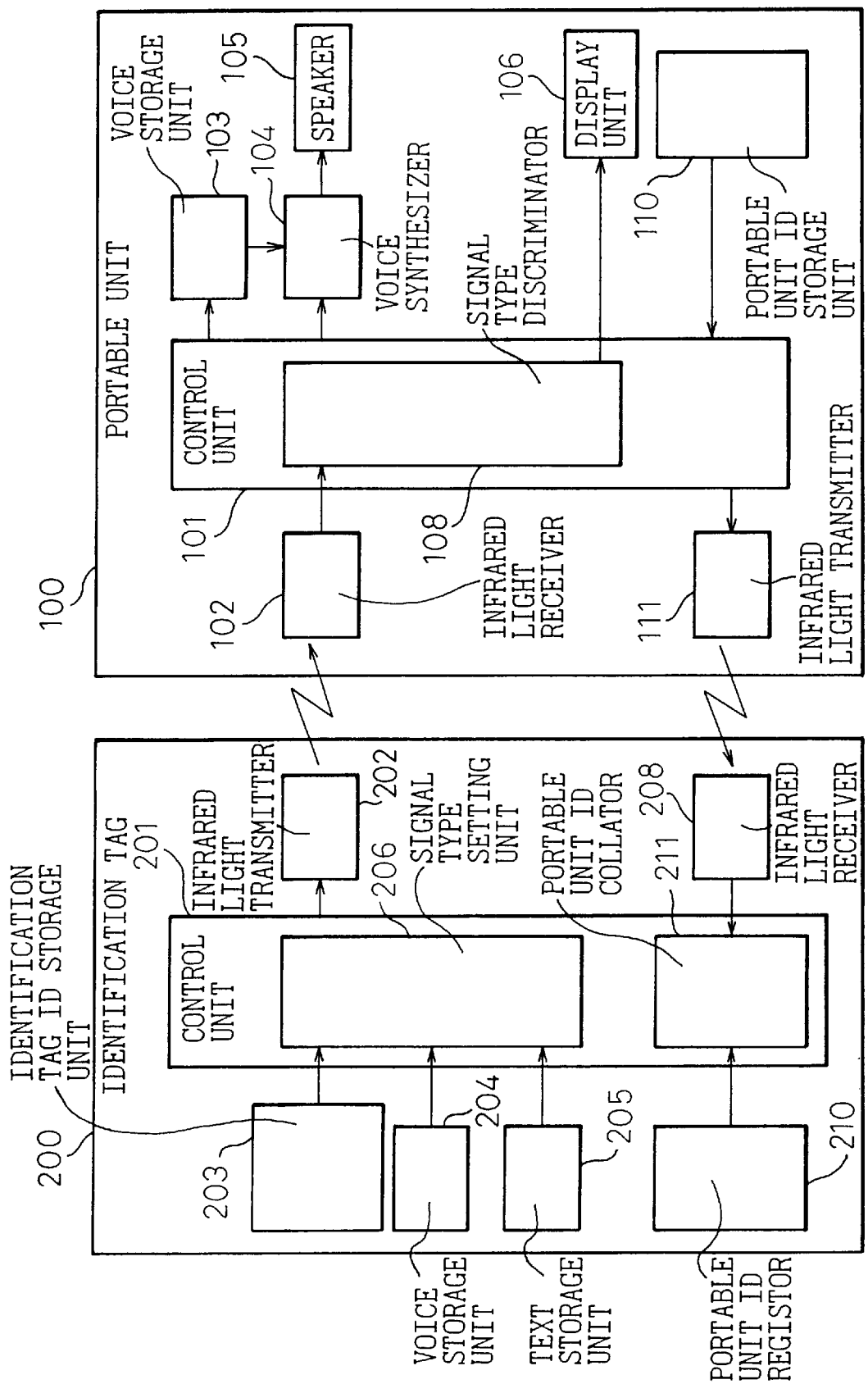
FIG. 22 is a functional diagram showing a 13th embodiment of the invention.

FIG. 22 is a functional diagram of the 12th embodiment in which, like the fifth embodiment, arbitrary information can be set in the identification tag 200.

Figure 23:
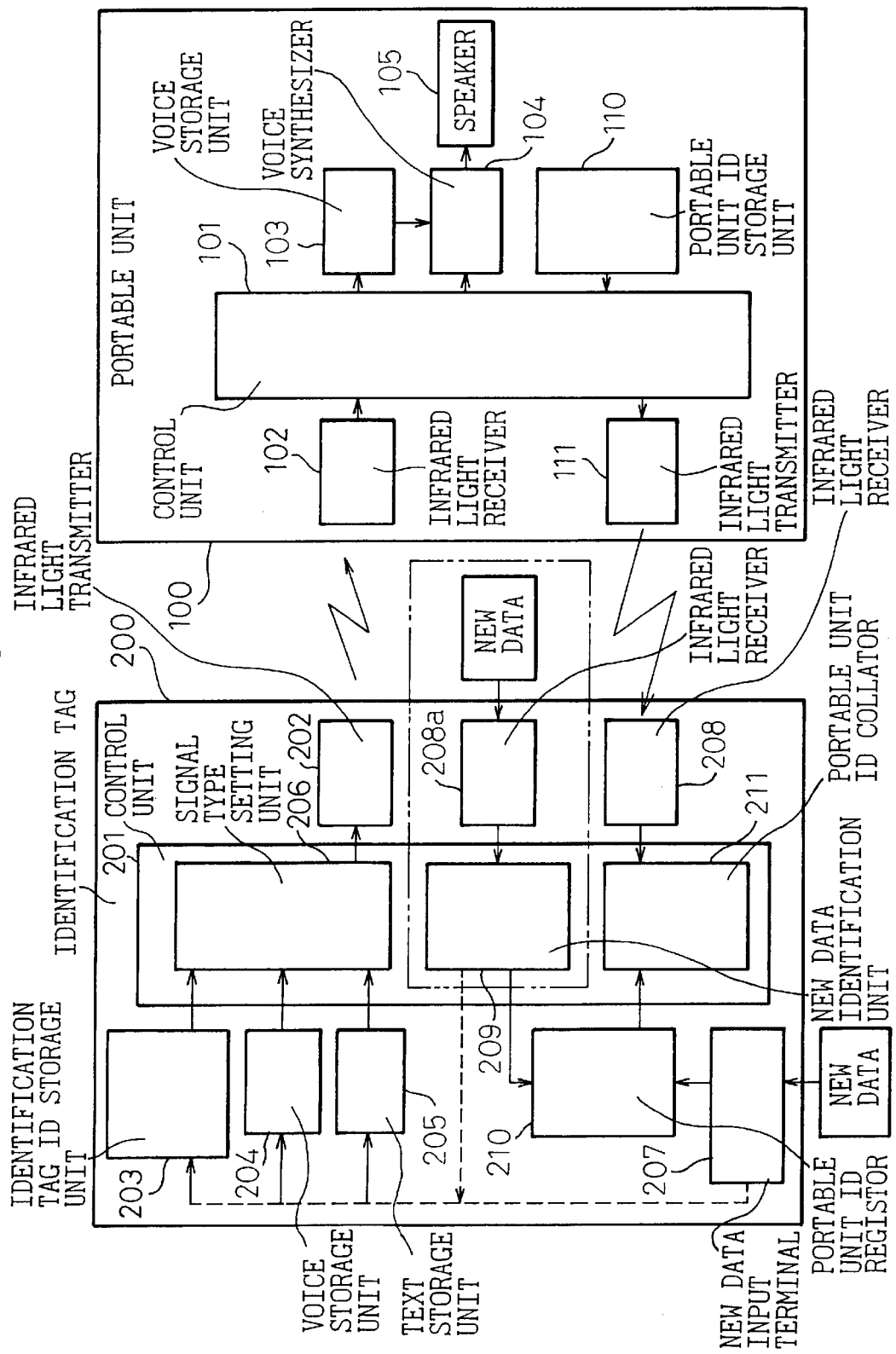
FIG. 23 is a functional diagram showing a 14th embodiment of the present invention.

FIG. 23 is a functional diagram showing a 13th embodiment, which like the sixth embodiment, additionally includes the function of changing the information stored in the identification tag 200. The infrared light receiver 208a can double as the infrared light receiver 208 for receiving the signal transmitted from the portable unit 100.

Figure 24:
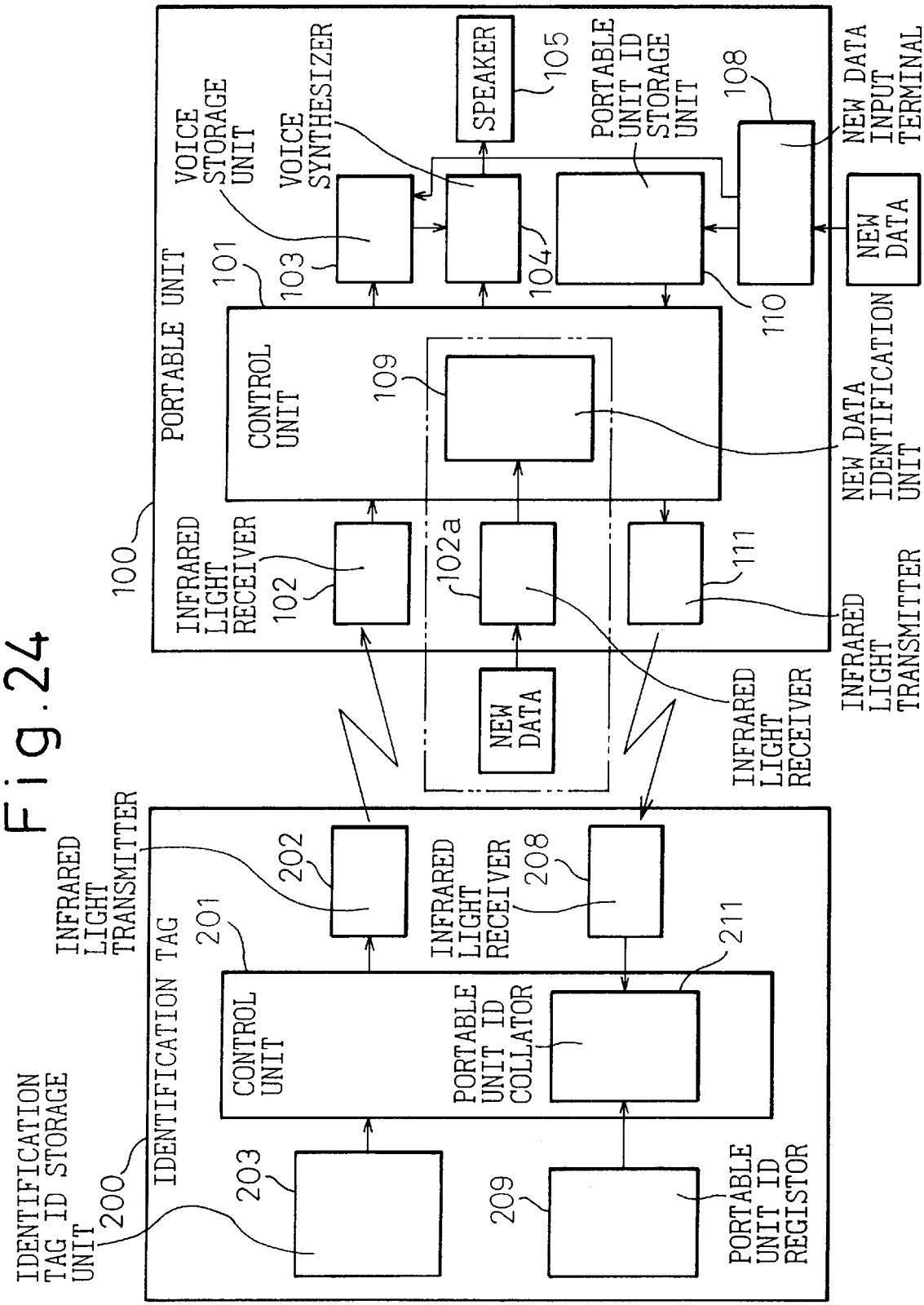
FIG. 24 is a functional diagram showing a 15th embodiment of the invention.

FIG. 24 is a functional diagram showing a 14th embodiment, which like the seventh embodiment, additionally includes the function of changing the information stored in the portable unit 100.

In the embodiments described above, in the case where the portable units IDs are transmitted to the identification tag 200 from a plurality of portable units, the same signal is transmitted to all the portable units as far as at least one portable unit ID is registered in the identification tag. For this reason, the user of a portable unit may receive a signal from his own portable unit.

Figure 25:
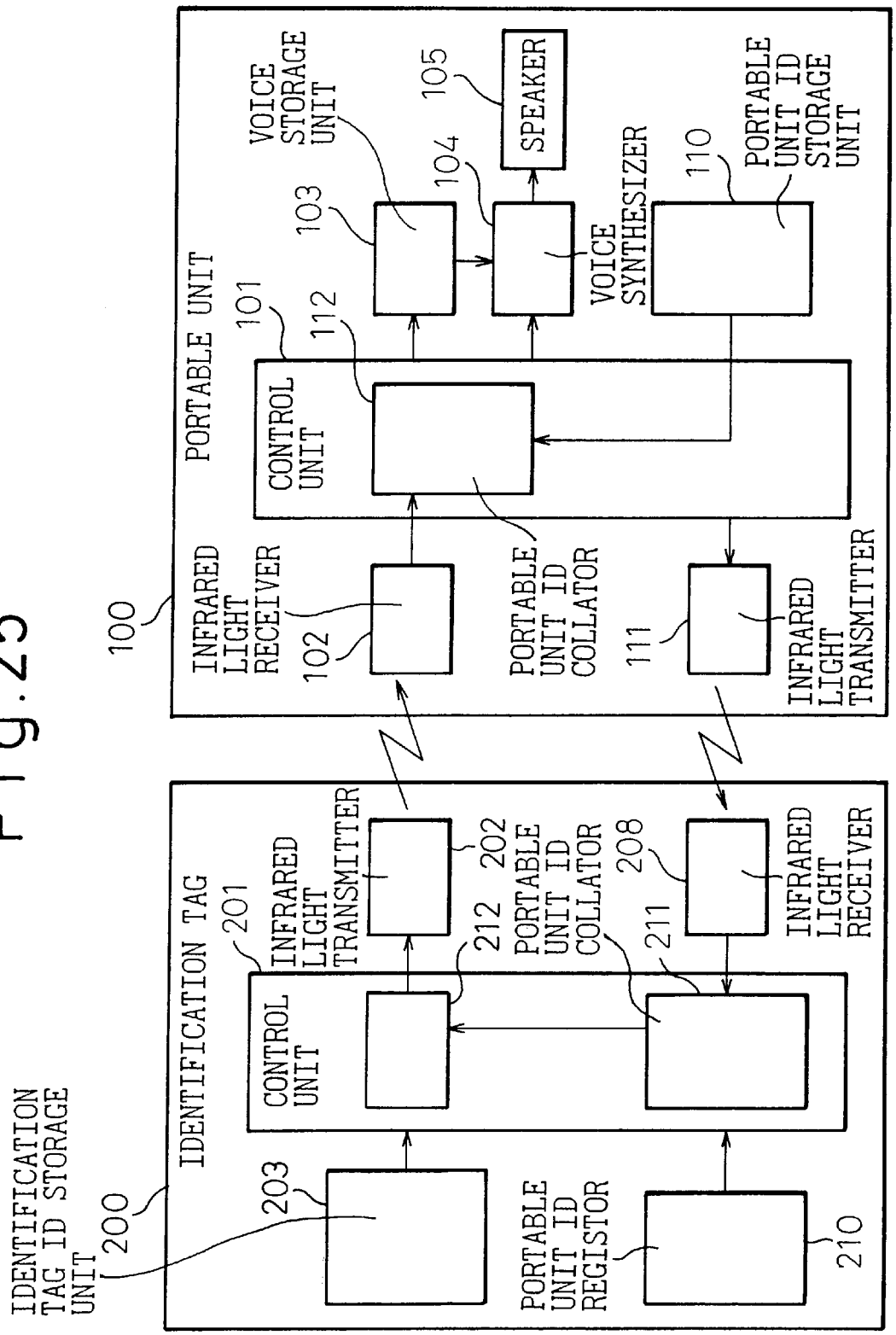
FIG. 25 is a functional diagram showing a 16th embodiment of the present invention.

FIG. 25 is a functional diagram showing a 15th embodiment for solving the above-mentioned problem. The portable unit controller 101 additionally includes a portable unit ID collator 112 for collating the portable unit ID transmitted from the identification tag 200 with the user's portable unit ID. Also, the identification tag control unit 201 additionally includes an information synthesizer 212 for synthesizing the identification tag ID stored in the identification tag ID storage unit 203 with the portable unit ID collated in the portable unit ID collator 211.

In the portable unit 100 according to this embodiment, the portable unit ID transmission routine shown in FIG. 13 is executed first.

Figure 26:
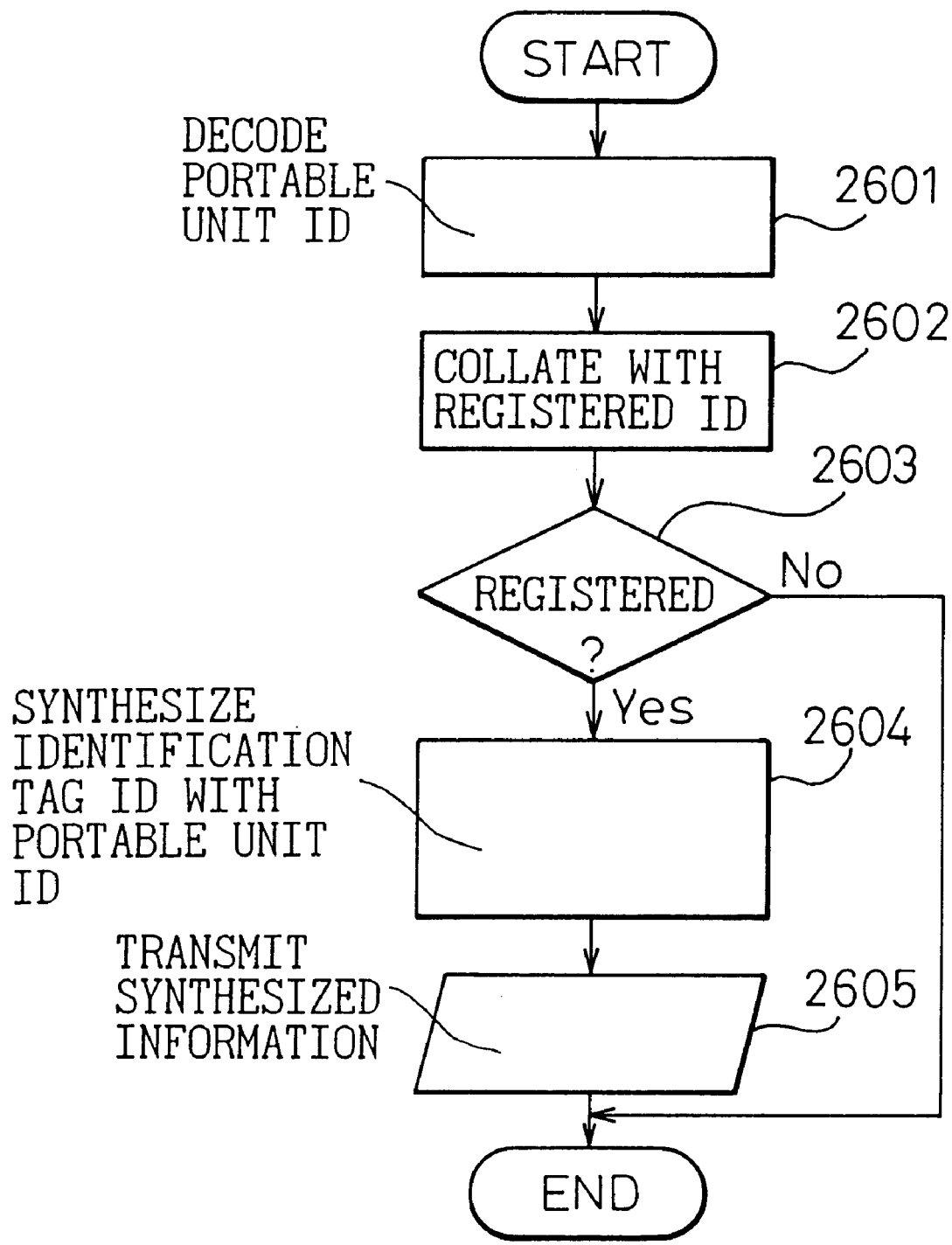
FIG. 26 is a flowchart for a third ID tag transmission routine.

FIG. 26 is a flowchart for a third identification tag transmission routine executed in the identification tag control unit 201 of an information service system according to a 15th embodiment. The execution of this flowchart is started when the identification tag receives the portable unit ID transmitted from the portable unit.

In step 2601, the portable unit ID is decoded, and in step 2602, the portable unit ID decoded is collated with the portable unit ID registered in the portable unit ID register 210, by the portable unit ID collator 211.

In step 2603, it is determined whether the portable unit that has transmitted the portable unit ID is registered or not, and if it is already registered, the identification tag ID stored in the identification tag ID storage unit 203 is synthesized with the portable unit ID in step 2604.

In step 2605, the synthesized information is transmitted through the infrared light transmitter 202 thereby to end the routine.

In the case where the determination is negative in step 2603, i.e. in the case where the portable unit is not registered, on the other hand, the routine is ended as it is or after transmitting the information to the effect that "Your portable unit is not yet registered".

Figure 27:
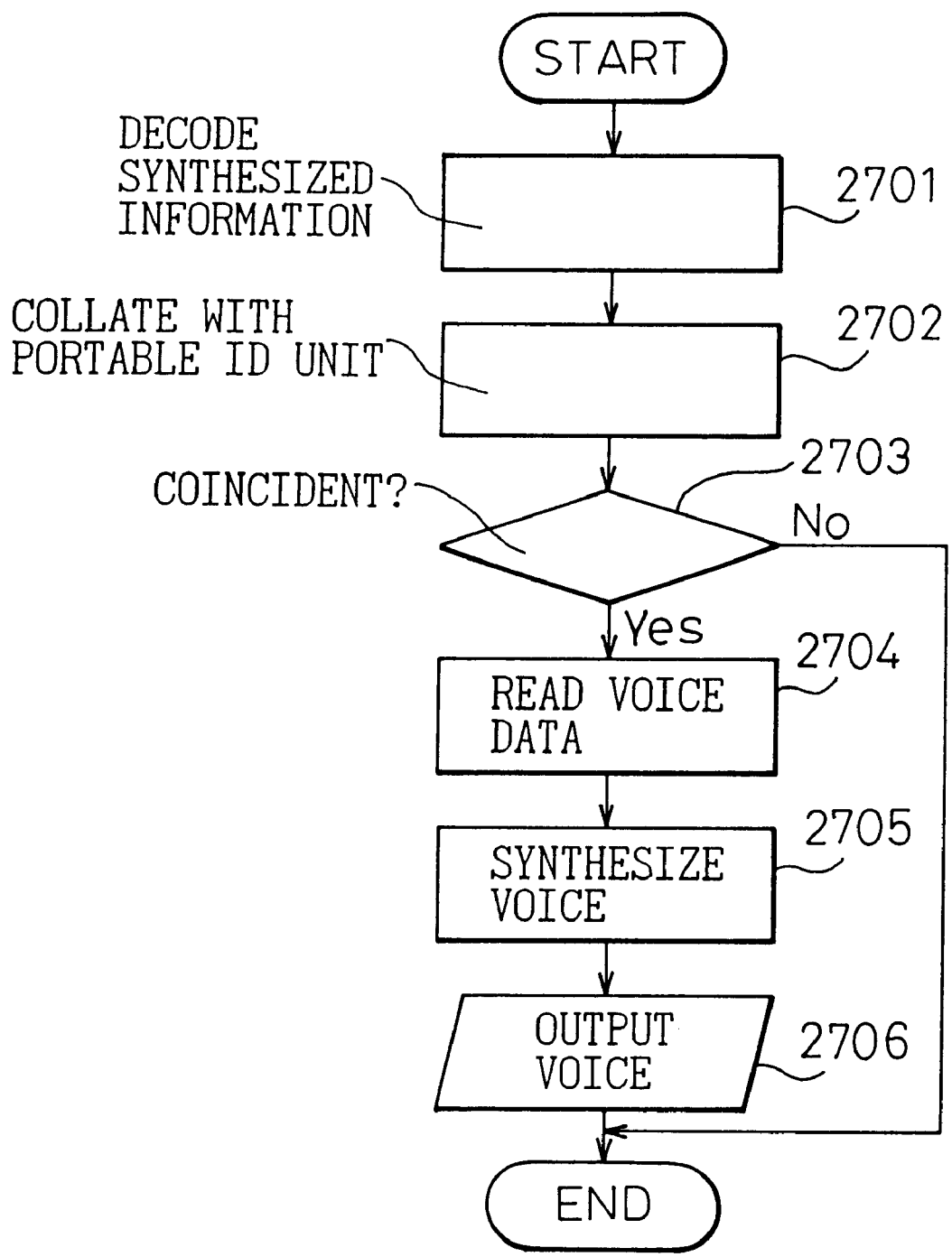
FIG. 27 is a flowchart for a fourth information output routine.

FIG. 27 is a flowchart for the fourth information output routine executed in the portable unit controller 101 of an information service system according to a 15th embodiment. The execution of this flowchart is started when the portable unit 100 receives the synthesized information transmitted from the identification tag.

In step 2701, the synthesized information is decoded. Then, in step 2702, the portable unit ID included in the synthesized information is collated with the portable unit ID stored in the portable unit storage unit 110.

In step 2703, it is determined whether the two portable unit IDs are coincident with each other, i.e. whether the information transmitted from the identification tag 100 is addressed to the user's portable unit or not.

In the case where the determination in step 2703 is affirmative, i.e. in the case where the information transmitted from the identification tag 100 is addressed to the user's portable unit, the voice data corresponding to the identification tag ID is read from the voice storage unit 103 in step 2704. After the aural synthesis in step 2705, the voice is output from the speaker 105 (or the earphone) in step 2706 thereby to end the routine In the case where the determination in step 2703 is negative, i.e. in the case where the information transmitted from the identification tag 100 is not addressed to the user's portable unit, in contrast, the routine is ended as it is.

Specifically, the identification tag 200 is provided with a portable unit ID register 210 to register the portable unit ID information (ID#2) in advance. When the infrared light receiver 208 receives an infrared light signal indicating the portable unit ID information (ID#1) from the portable unit 100, the identification tag control unit 201 of the identification tag 200 extracts the portable unit ID information (ID#1). In the portable unit ID collator 215, the portable unit ID information (ID#2) registered in the portable unit ID register 210 is collated with the extracted portable unit ID information (ID#1), and in the case where the two IDs are coincident with each other, the synthesized information of the identification tag ID information and the portable unit ID information (ID#2) for specifying the portable unit 100 is transmitted.

Then, the portable unit 100 receives the synthesized information from the identification tag 200 through the infrared light receiver 102, and extracts the portable unit ID information (ID#2) through the controller 101. In the portable unit ID collator 112, the portable unit ID information (ID#1) stored in the portable unit ID storage unit 110 is collated with the portable unit ID information (ID#2) extracted, so that in the case of coincidence, the predetermined information such as the voice information is output. The predetermined information is processed and output through the voice storage unit 103, the voice synthesizer 104 and the speaker 105 (or the earphone).

According to this embodiment, in the case where the identification tag is accessed simultaneously by a plurality of portable units 100 in registration, the potable unit ID information (ID#2) included in the synthesized information transmitted from the identification tag 200 toward each portable unit 100 permits the user to positively identify whether the information transmitted by the identification tag is addressed to him or not.

Figure 28:
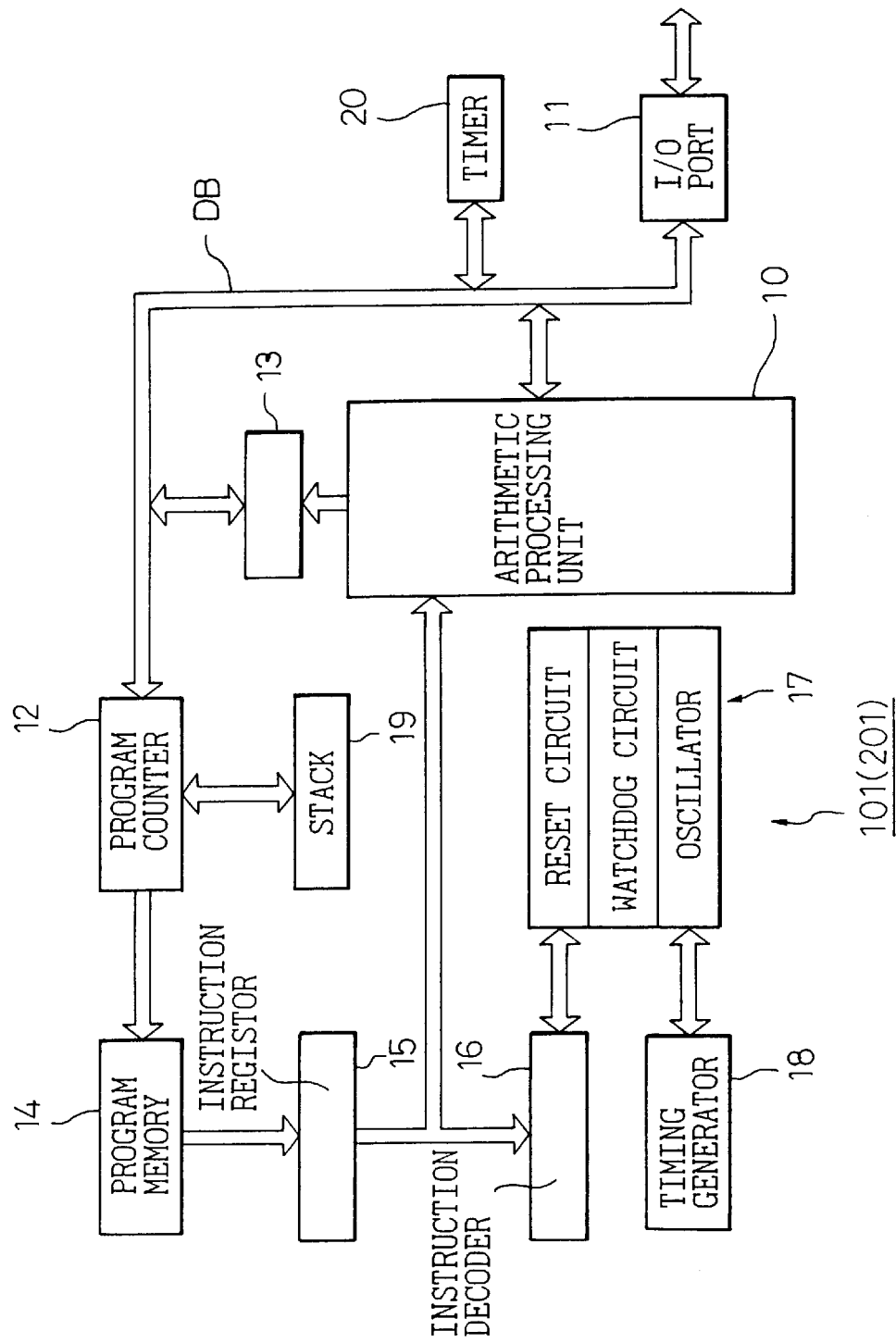
FIG. 28 shows an example configuration of the control unit.

FIG. 28 is a diagram showing a configuration of the control unit used with the portable unit 100 and the identification tag 200 according to each embodiment described above.

Specifically, the controller 101 (or 201) has the form of one-chip microcomputer and includes arithmetic processing unit 10, an I/O port 11 connected to the arithmetic processing unit 10 through a data bus DB, a program counter 12 connected to the I/O port 11 through the data bus DB, a RAM 123 connected between the data bus DB and the arithmetic processing unit 10, a program memory 14 connected in the stage after the program counter 12, an instruction register 15 connected between the program memory 14 and the arithmetic processing unit 10, an instruction decoder 16 connected in the stage after the instruction register 15, circuits (oscillator, a reset circuit and a watchdog circuit) 17 connected to the instruction decoder 16, a timing generator 18 connected to the circuits 17, a stack 19 connected to the program counter 12, and a timer 20 connected to the data bus DB.

The I/O port 11 transmits and receives signals to and from the various functions external to the controller, including the infrared light transmitter, the infrared light receiver, the portable unit ID storage unit, the portable ID register and the predetermined information storage unit 6.

The arithmetic processing unit 10 includes the functions corresponding to the respective embodiments, i.e. the signal type setting unit 206 in the fifth embodiment of FIG. 9, the changed data identifier 209 in the sixth embodiment of FIG. 10, the changed data identifier 109 in the seventh embodiment of FIG. 11, the portable unit ID collator 211 in the eighth embodiment of FIG. 12 and the portable unit ID collator 12 and the information synthesizer 212 according to the 16th embodiment shown in FIG. 25.

With this configuration, the write/read operation is performed through the data bus DS into and from the RAM 13. Also, by changing the contents of the program memory 14, the function of the arithmetic processing unit 10 can be adapted to each embodiment described above Further, the stack 19 has stored therein the counter value (data indicating which program, as counted from the first one, is being executed) of the program interrupted at the time of interrupt handling. When the interrupt is canceled, therefore, the interrupted program can be continued by referring to the counter value stored in the stack 19 through the program counter 12.

In actual system operation, assume that the portable unit 100 receives a battery capacity shortage code as the predetermined information from the identification tag 200. The interrupt handling process is performed and the battery capacity shortage message is issued to the user by the voice or the like from the portable unit 100.

The timer 20 is provided for generating an interrupt for each specified period. This period is set in the timer 20 from the program memory 14 through the arithmetic processing unit 10. The reference clock of the timer 20 is obtained from the oscillator in the circuit 17.

In actual system operation, a sleep mode (for minimizing the power consumption) is provided in the identification tag 200 for saving the power. The identification tag 200 periodically checks for the presence or absence of the signal from the portable unit 100, and in the presence of such a signal, proceeds to the steady operation (large power consumption). In other words, the periodical check is carried out by generating a periodic interrupt from the timer 20.

Specific applications of the information service system according to this invention will be explained below with reference to the drawings.

Figure 29:
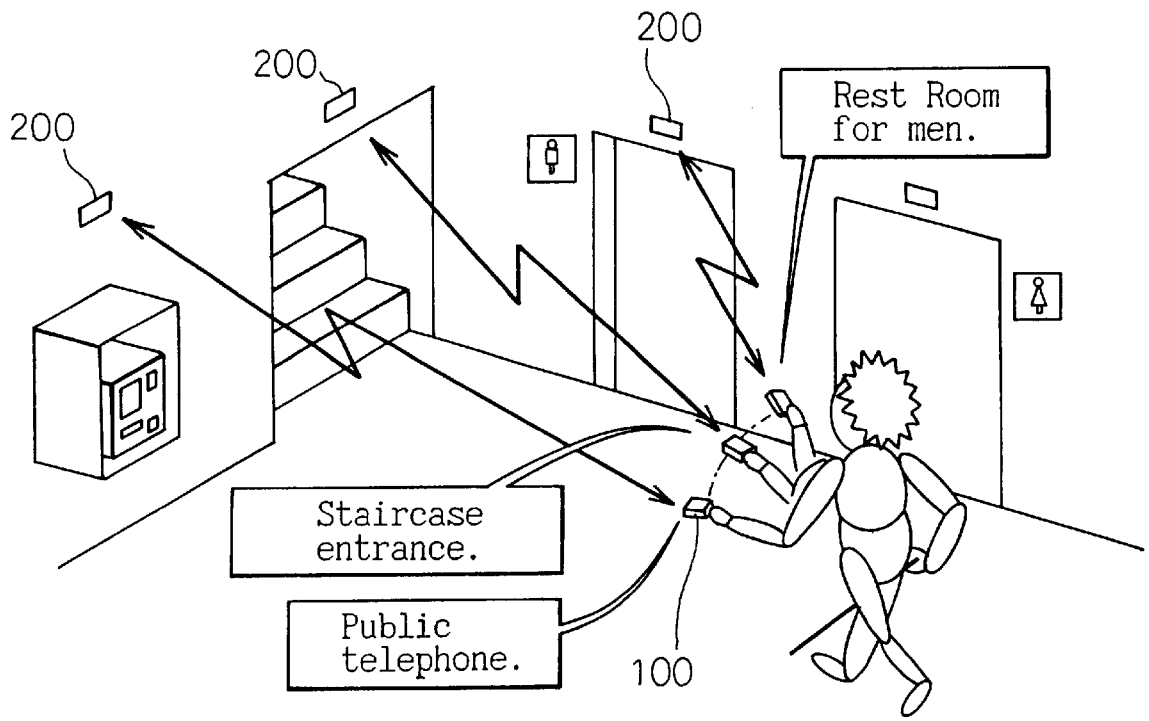
FIG. 29 is a diagram for explaining a first application of the information service system according to the invention.

First Application (See FIG. 29)

This application represents a case of supporting the walking or movement in a building or the use of internal equipment of a building.

In a building or a facility, an identification tag 200 is installed at points required for walking or relocation or at dangerous points requiring attention (such as the foot of a staircase, the head of the staircase or the rest room) or at points in the vicinity of the indoor equipment having a high frequency of use (a telephone set, for example), so that visually handicapped persons (users) can receive the information service as to their present position from the identification tag 200 through the portable unit 100.

As a result, the safety of the autonomous walking or relocation of the users can be supported.

Figure 30:
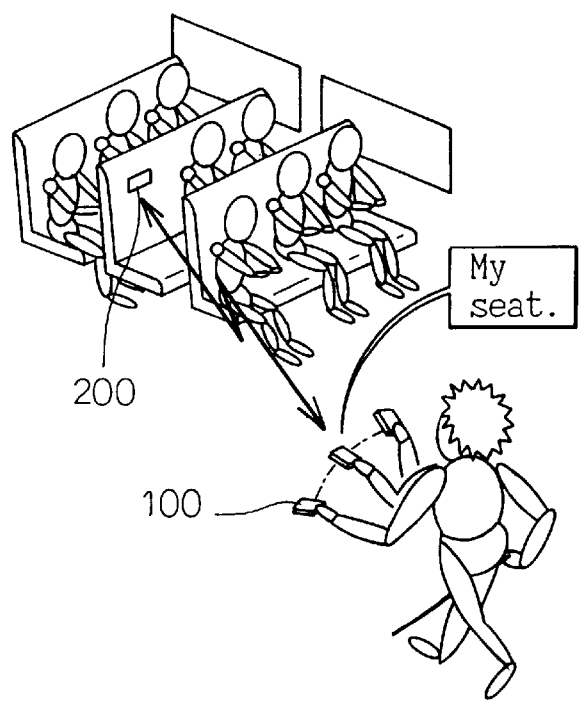
FIG. 30 is a diagram for explaining a second application of the information service system according to the invention.

Second Application (See FIG. 30)

This application represents the case of supporting the walking or movement in the vehicles such as trains.

The crew members or the like attach the identification tag 200 by adhesive tape or fastening pin to the seat to be held by a user in the trains or airplanes. The user thus can find his seat with the identification tag 200 through the portable unit 100.

As a result, in the case where the user leaves his seat in the train or airplane, he can walk by himself without being anxious about other passengers, thereby supporting the safety of the movement.

Figure 31:
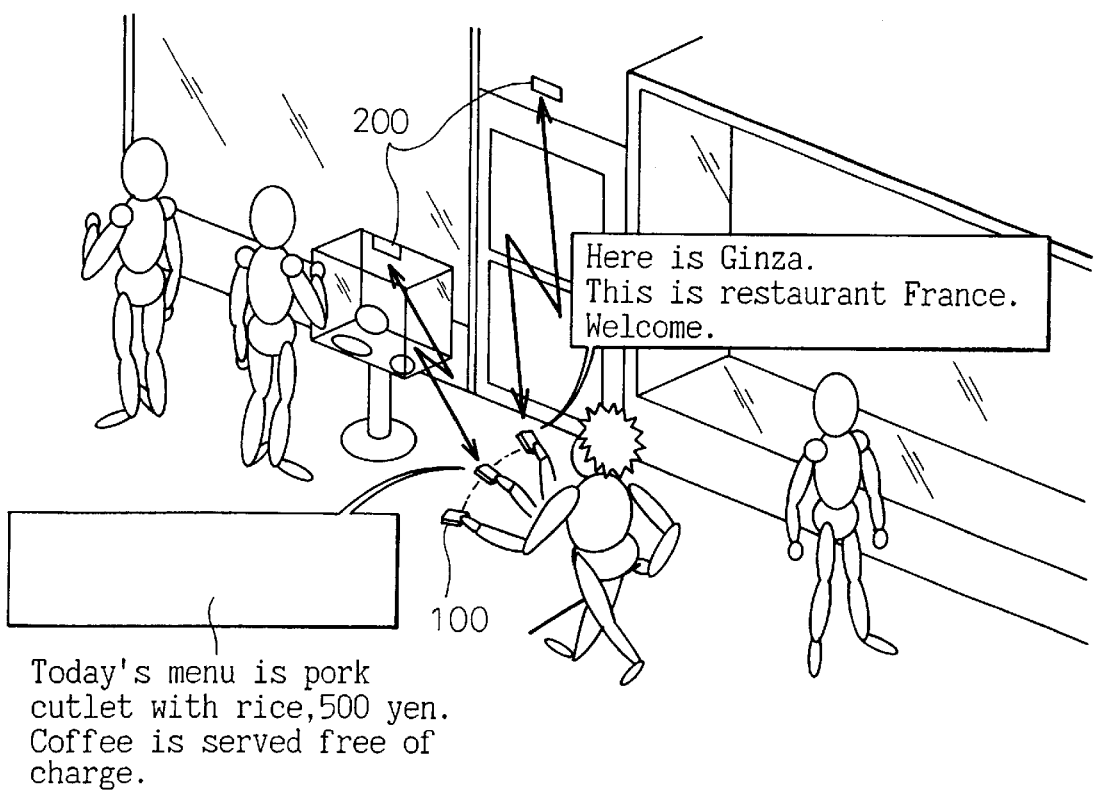
FIG. 31 is a diagram for explaining a third application of the information service system according to the invention.

Third Application (See FIG. 31)

This application represents the case of supporting walking, the movement and the purchase in a shopping center or a shop, for example.

The identification tag 200 is installed at points (for example, signboard and entrance, a show window, a show case or a stand of a shop) requiring a guide for use in shopping centers or ordinary shops.

The user operating the portable unit 100 can receive the service such as the information (the name and address of the shop, for example) on the present position of the user and the information on the commodity sale (such as the commodity information, the daily menu, bargain sale information, commercials, etc.).

As a result, the autonomous walking of the user and safety and convenience and safety of the movement of the user are assured, thereby making it possible to support the autonomous purchase.

Figure 32:
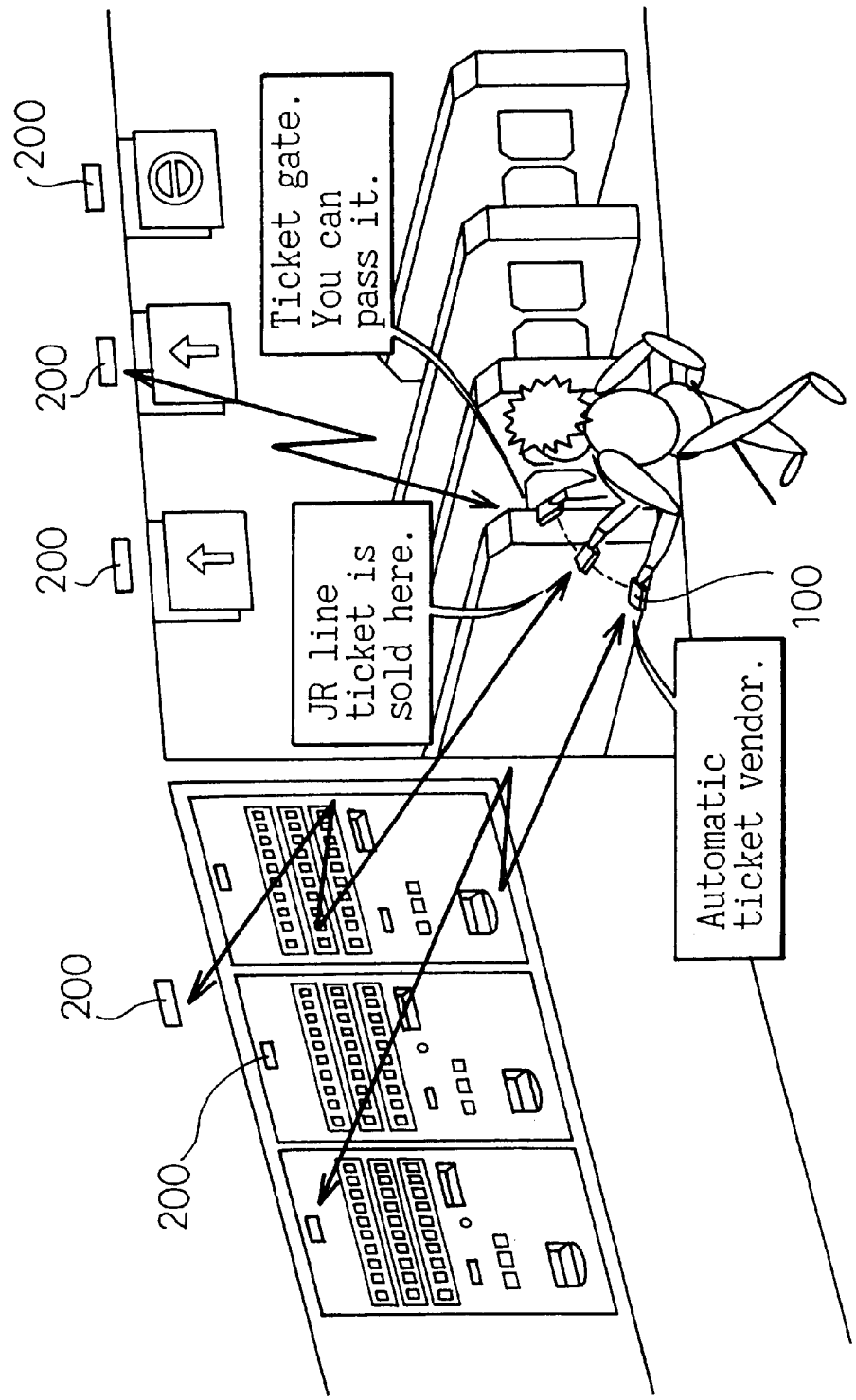
FIG. 32 is a diagram for explaining a fourth application of the information service system according to the invention.

Fourth Application (See FIG. 32)

This application represents the case of supporting the walking or movement and the purchase of a ticket in a station.

In a railway station or the like, an identification tag 200 is installed at points requiring the guide for use (for example, the ticket window, the automatic ticket vendor, the ticket gate, etc.), so that the user can receive the service including the information of his present position (the position of the ticket window, the ticket gate, etc.) from the identification tag 200 through his portable unit 100.

As a result, the autonomous walking and the safety and convenience of his movement can be supported when purchasing the ticket or passing through the ticket gate.

Figure 33:
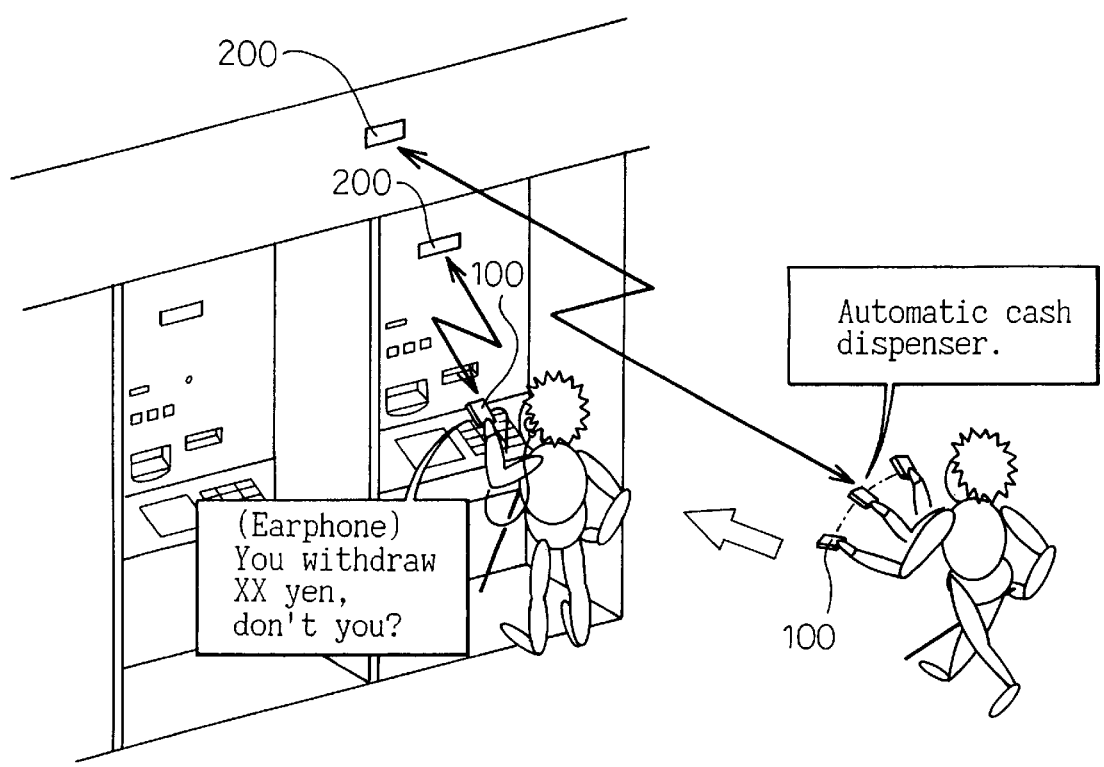
FIG. 33 is a diagram for explaining a fifth application of the information service system according to the invention.

Fifth Application (See FIG. 33)

This application represents the case of supporting the use of a cash machine corner of a bank.

In the cash machine corner of a bank, the identification tag 200 is installed at points requiring the guide for use (such as at points where the automatic cash dispenser, the operating unit of the automatic cash dispenser, etc. is installed), so that the user can receive the service including the information on the position and operation of the automatic cash dispenser based on the identification tag 200 using his portable unit 100.

As a result, the autonomous walking and movement, and the safety and convenience of depositing or withdrawing money into and from the account of the user by the automatic cash dispenser can be supported.

Figure 34:
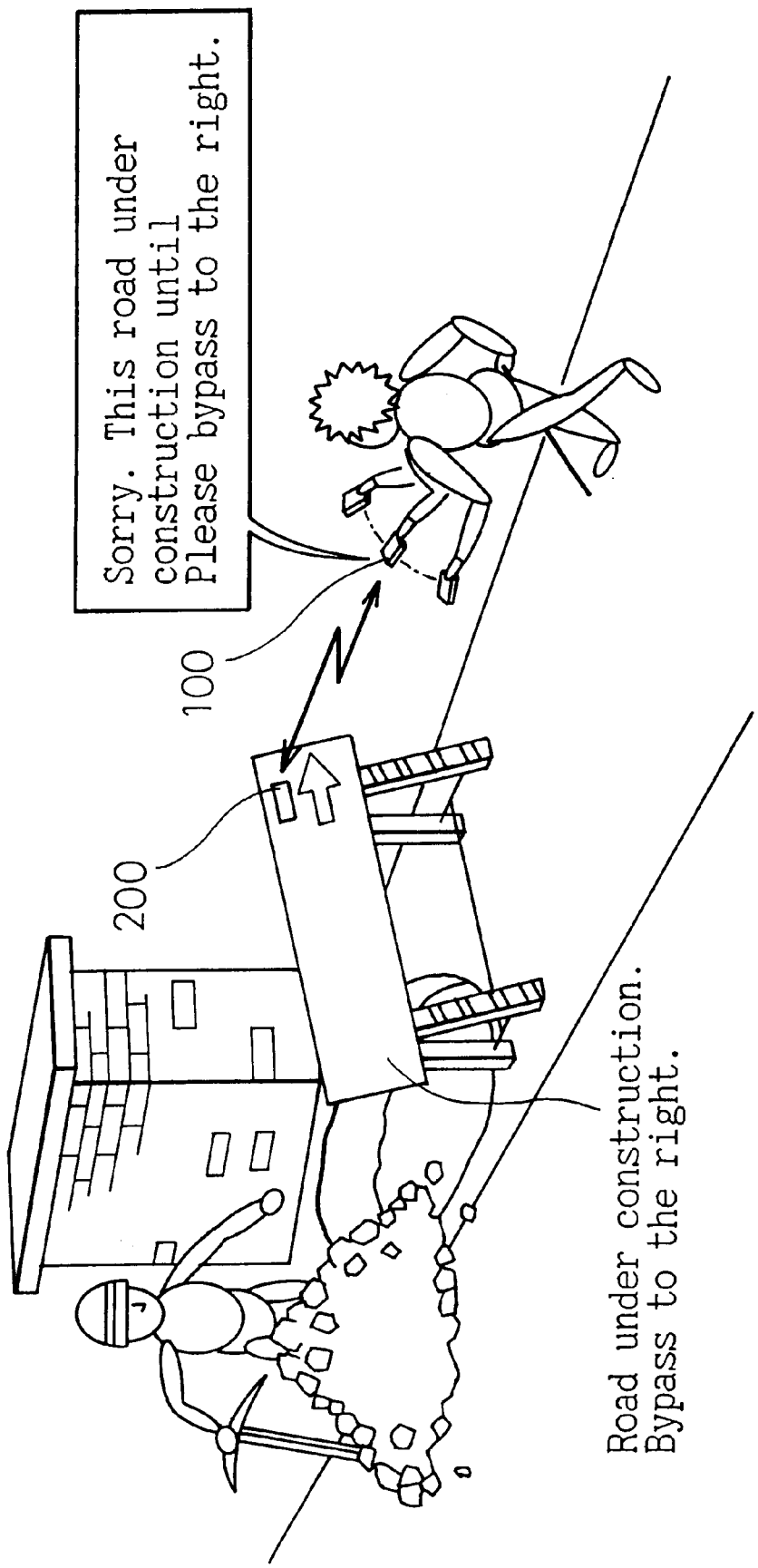
FIG. 34 is a diagram for explaining a sixth application of the information service system according to the invention.

Sixth Application (See FIG. 34)

This application represents the case of supporting the safe walking near a construction site.

The identification tag 200 is installed at points requiring the announcement to the passersby (with an announcement board erected at a detouring point, etc.) that the construction is under way at a construction site including a sidewalk or the like, so that the user can receive the service including the information (explanation about the construction progress, guide to the detour, etc.) written on the announcement board based on the identification tag 200 using his portable unit 100.

As a result, when passing by the road under construction, the user can notice the abnormality of the road and avoid falling or the like, thereby supporting safe autonomous walking and movement.

Figure 35:
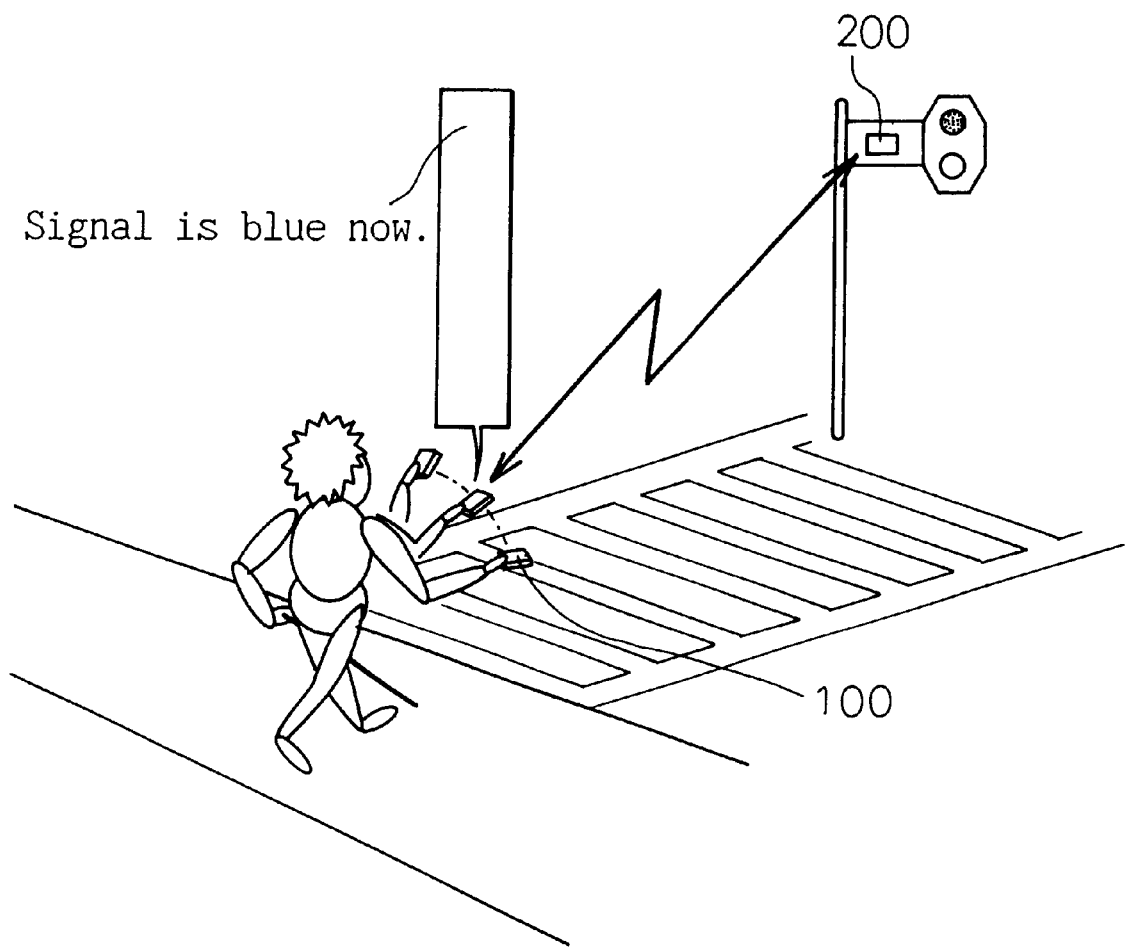
FIG. 35 is a diagram for explaining a seventh application of the information service system according to the invention.

Seventh Application (See FIG. 35)

This application represents the case of supporting safe walking at a pedestrian crossing.

In a pedestrian crossing, an identification tag 200 is installed on the traffic signal, so that the user can receive the guide including the information on the signal (information that the green or red light is on, or whether the pedestrian can cross the way or not) based on the identification tag 200 using his portable unit 100.

As a result, the safe autonomous walking and movement of the user on a pedestrian crossing can be assured.

Figure 36:
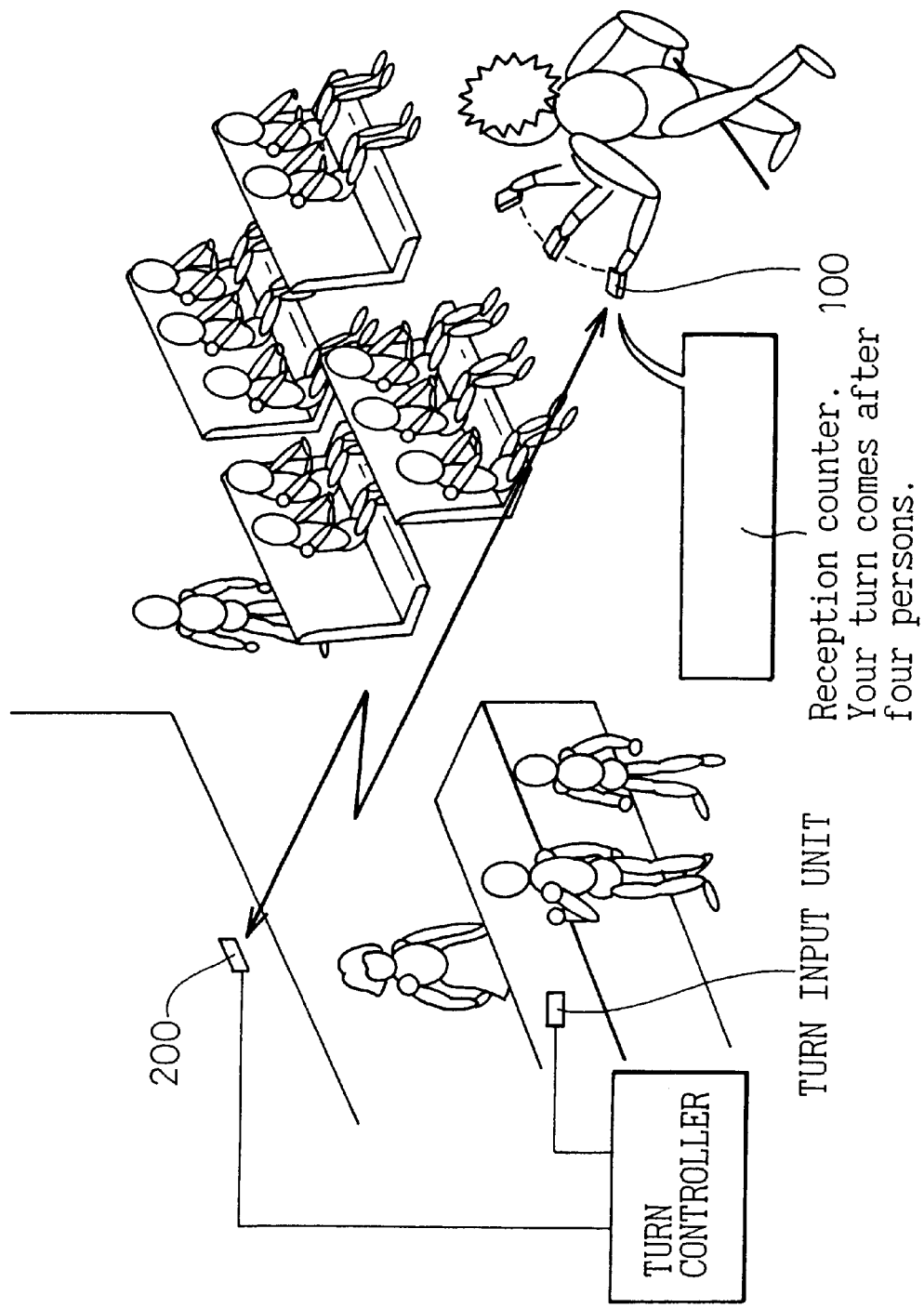
FIG. 36 is a diagram for explaining an eighth application of the information service system according to the invention.

Eighth Application (See FIG. 36)

This application represents the case of supporting the walking or movement in a municipal office or a hospital.

In a municipal office, the identification tag 200 is installed at points (such as the information counter, the pension department, the health and welfare department, or other windows or counters) requiring the guide for use of the internal facilities.

In a hospital, on the other hand, the identification tag 200 is installed at points (such as the information counter, the pharmaceutical office, the accounting department, various medical inspection rooms, various clinics, etc.) requiring the guide for using the internal facilities.

The user can receive the guide as to the position of a particular facility or when his turn comes based on the identification tag 200 through the portable unit 100.

As a result, the autonomous walking and movement and the autonomous use of the facilities by the user can be supported.

Figure 37:
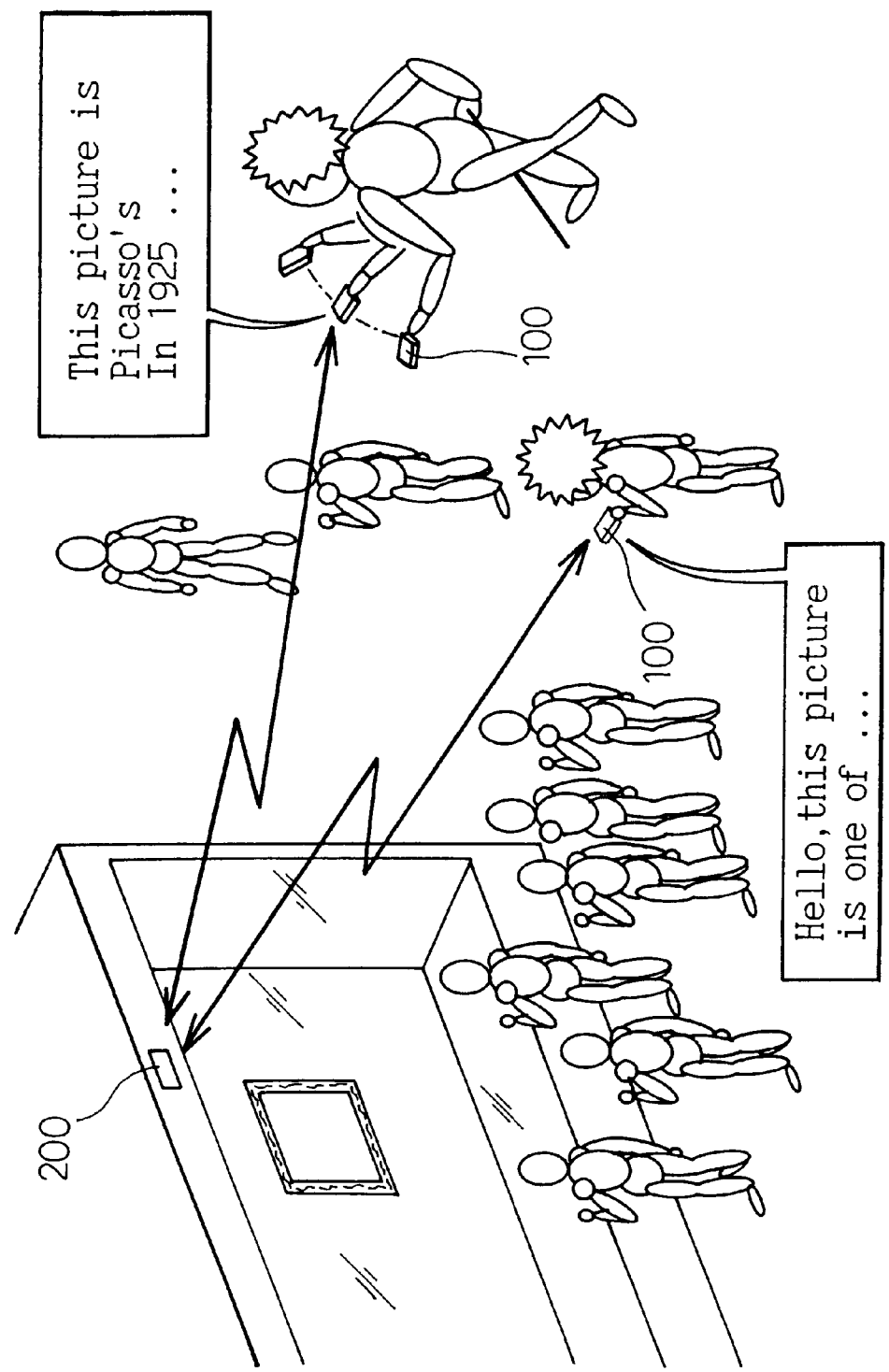
FIG. 37 is a diagram for explaining a ninth application of the information service system according to the invention.

Ninth Application (See FIG. 37)

This application represents the case of supporting the walking and movement in an art museum, library, exhibition ground or the information on and guide to the exhibits.

The identification tag 200 is installed at points (for example, individual exhibits, cases and racks of books, entrances and rest rooms, etc.) requiring a guide for seeing and reading.

The user can receive the required information (the information and explanation about individual exhibits, passages to follow, available facilities, etc.) from the identification tag 200 through the portable unit 100.

As a result, the autonomous walking and movement and the autonomous use of the facilities by the user can be supported.

Also, in the case where the portable unit 100 is equipped with a removable storage unit (IC card), proper information can be supplied to the users of all categories including language, generation and sex.

Figure 38:
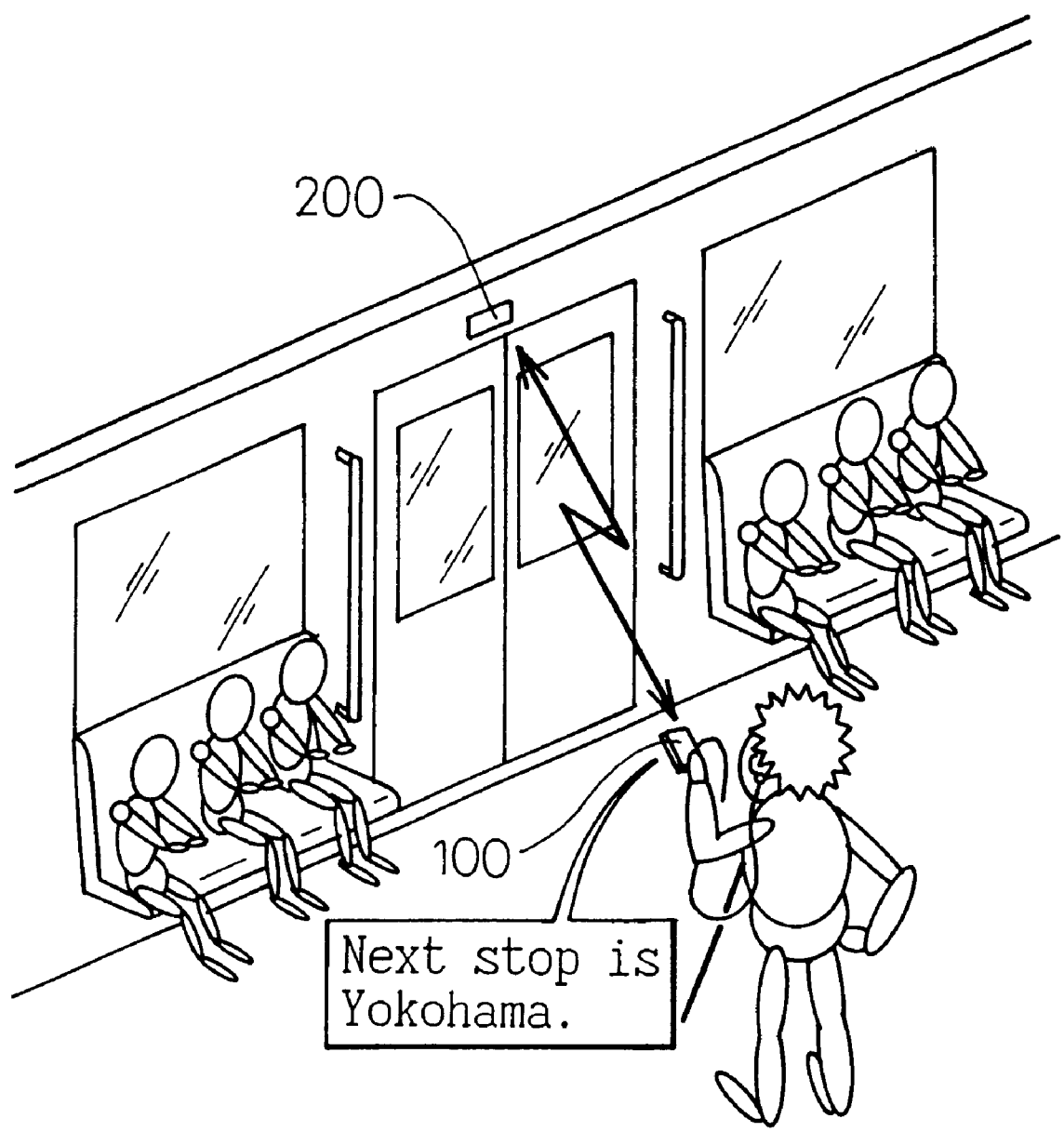
FIG. 38 is a diagram for explaining a tenth application of the information service system according to the invention.

Tenth Application (See FIG. 38)

This application represents the case of supporting the user getting on or off the train or the like.

In the railway coaches, the identification tag 200 is installed at points (for example, at the upper portion of each door or the vicinity thereof in the train) requiring the guide to the operation of the train (such as the destination, the next station to stop, the estimated required time, transfer information, etc.).

The user can receive the guide to the train operation from the identification tag 200 using the portable unit 100.

As a result, the user can safely get off the train at an appropriate station served.

As easily inferred from the shown examples by those skilled in the art, the identification tag, if installed in the vicinity of the upper portion of the bus entrance or at the upper portion of the destination indication board of a bus terminal, can support the user in getting on the bus.

In similar fashion, in the case where the user is waiting for the arrival of a train on a station platform, the embodiment can effectively support the user in getting on the train by checking the entrance door position and the door open state of the train as soon as the train arrives (the door opens).

Further, in elevators and other traffic means, the user can be supported in getting on or off the traffic means by determining the open or closed state of the door if the identification tag is installed in the vicinity of the upper portion of the door.

Figure 39:
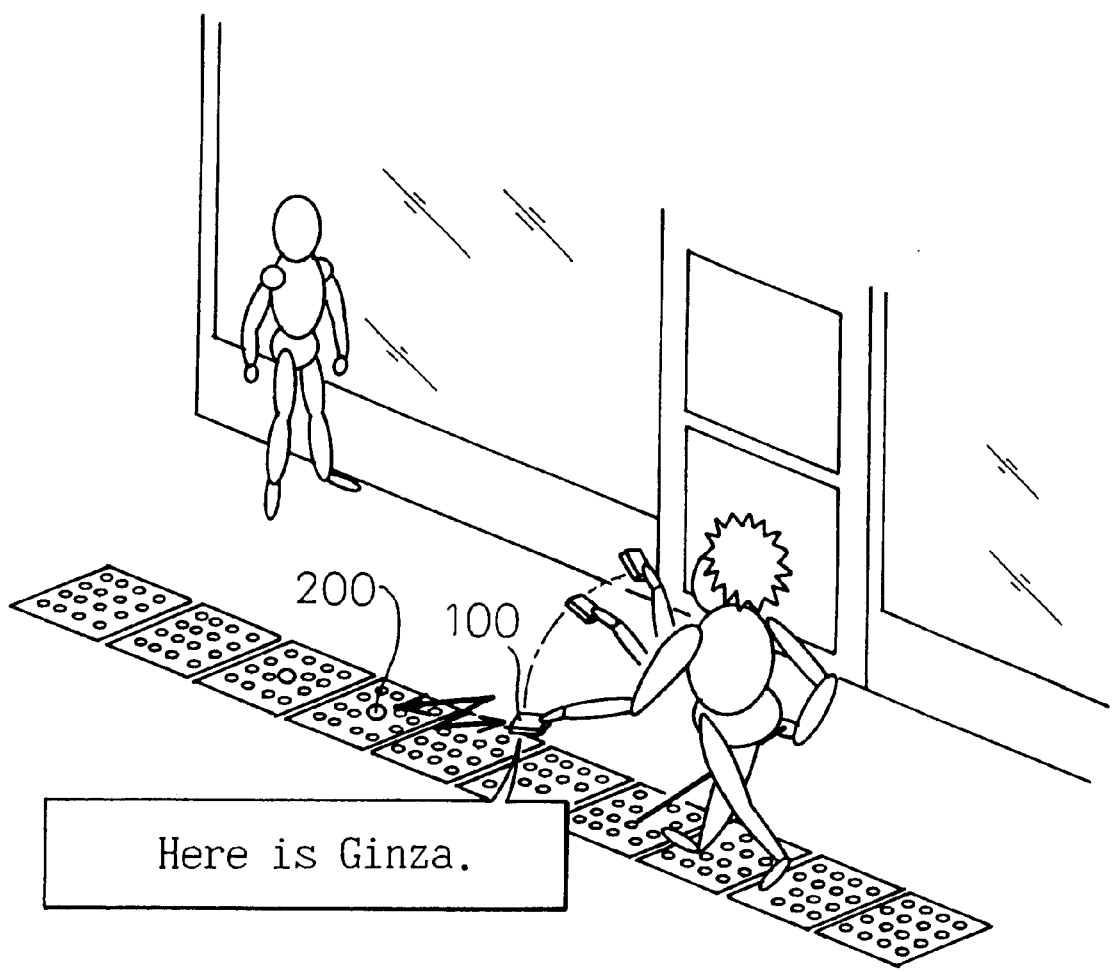
FIG. 39 is a diagram for explaining an 11th application of the information service system according to the invention.

11th Application (See FIG. 39)

This application represents the case of supporting the walking on a sidewalk or the like.

On a sidewalk in an urban area, for example, the identification tag 200 is installed (buried) at points (on the braille blocks on the sidewalk, for example) requiring the guide to the present position of the user.

The user can receive the service including the information on the present position (such as the names of blocks, passage, address or main buildings nearby) from the identification tag 200 through the portable unit 100.

As a result, the autonomous walking and the safe movement of the user on an urban sidewalk can be supported.

In each of the embodiments described above, the infrared light (IR) is used as a medium of transmission between the portable unit 100 and the identification tag 200. The present invention of course is not limited to such a medium. For example, the laser light or the ultrasonic wave can be used for transmission instead of the infrared light (IR).

Also, the general configuration and design of the information service system or details thereof can of course be modified appropriately without departing from the spirit and scope of the invention.

As described above, in an information service system according to this invention, information can be supplied to the limited users without giving rise to any operation error or abnormal interference, thereby preventing the tampering or disturbance.

Further, by using an appropriate combination of voices, texts and vibrations, information service can be offered by texts and vibrations as well as by voices, thus making the use by aged persons and aurally handicapped persons possible.

Furthermore, by making changeable the contents of the storage unit and the register arranged in the identification tag and the portable unit, the maintenance and control of the information service system is facilitated.

What is claimed is:

1. An information service system for supplying the user with information on the present position or a specific place which the user is approaching, comprising:
   a portable unit carried by said user and an identification tag installed at a specific place, wherein said identification tag includes:
      a predetermined information storage unit for storing predetermined information;
      an identification tag control unit for generating the transmission information including the predetermined information stored in said predetermined information storage unit, and
      an identification tag transmitter for transmitting the transmission information generated in said identification tag control unit; and
   wherein said portable unit includes:
      a portable unit receiver for receiving the transmission information transmitted from said identification tag transmitter;
      a portable unit controller for selecting the guide information in accordance with the transmission information received by said portable unit receiver; and
      a portable unit information output unit for outputting the guide information selected by said portable unit controller;
   wherein said predetermined information storage unit includes selected one of an identification tag ID information storage unit for storing the identification tag ID information for specifying the user, a voice storage unit for storing the voice information and a symbol information storage unit for storing the symbol information including alpha-numeric characters;
   wherein said identification tag control unit includes an information type setting unit for setting the type of the information output from said identification tag ID information storage unit; and
   wherein said portable unit controller includes an information type determination unit for determining the type of the transmission information received by said portable unit receiver.

2. An information service system for supplying the user with information on the present position or a specific place which the user is approaching, comprising:
   a portable unit carried by said user and an identification tag installed at a specific place, wherein said identification tag includes:
      a predetermined information storage unit for storing predetermined information;
      an identification tag control unit for generating the transmission information including the predetermined information stored in said predetermined information storage unit, and
      an identification tag transmitter for transmitting the transmission information generated in said identification tag control unit; and
   wherein said portable unit includes:
      a portable unit receiver for receiving the transmission information transmitted from said identification tag transmitter;
      a portable unit controller for selecting the guide information in accordance with the transmission information received by said portable unit receiver; and
      a portable unit information output unit for outputting the guide information selected by said portable unit controller;
      an information service system as described in claim 1, wherein said identification tag further includes:
         a predetermined information changing unit for changing the specific information stored in said predetermined information storage unit.

3. An information service system for supplying the user with information on the present position or a specific place which the user is approaching, comprising:
   a portable unit carried by said user and an identification tag installed at a specific places wherein said identification tag includes:
      a predetermined information storage unit for storing predetermined information;
      an identification tag control unit for generating the transmission information including the predetermined information stored in said predetermined information storage unit, and
      an identification tag transmitter for transmitting the transmission information generated in said identification tag control unit; and
   wherein said portable unit includes:
      a portable unit receiver for receiving the transmission information transmitted from said identification tag transmitter;
      a portable unit controller for selecting the guide information in accordance with the transmission information received by said portable unit receiver;
      a portable unit information output unit for outputting the guide information selected by said portable unit controller;
      an information service system as described in claim 1, wherein said portable unit further includes a guide information changing unit for changing the guide information stored in the said portable unit controller.

4. An information service system for supplying the user with information on the present position or a specific place which the user is approaching, comprising:
- a portable unit carried by said user and an identification tag installed at a specific place, wherein said identification tag includes:
  - a predetermined information storage unit for storing predetermined information;
  - an identification tag control unit for generating the transmission information including the predetermined information stored in said predetermined information storage unit, and
  - an identification tag transmitter for transmitting the transmission information generated in said identification tag control unit; and wherein said portable unit includes:
  - a portable unit receiver for receiving the transmission information transmitted from said identification tag transmitter;
  - a portable unit controller for selecting the guide information in accordance with the transmission information received by said portable unit receiver;
  - a portable unit information output unit for outputting the guide information selected by said portable unit controller;
  - an information service system as described in claim 1, wherein said portable unit further includes:
    - a portable unit ID information storage unit for storing the ID information for specifying the user; and
    - a portable unit transmitter for transmitting the portable unit ID information stored in said portable unit ID information storage unit;
- wherein said identification tag further includes:
  - an identification tag receiver for receiving the portable unit ID information transmitted from said portable unit transmitter;
- a portable unit ID information storage unit for storing the portable unit ID information set in advance; and
- a second identification tag control unit for collating the portable unit ID information received by said identification tag receiving unit with the portable ID information stored in said portable unit ID information storage unit, and when said information are coincident with each other, permitting said identification tag control unit to generate the guide information including the identification tag ID information stored in the identification tag ID information storage unit.

5. An information service system as described in claim 4, wherein said predetermined information storage unit includes an identification tag ID information storage unit for storing the identification tag ID information for specifying the user as predetermined information.

6. An information service system as described in claim 5, wherein said portable unit information output unit includes at least selected one of a voice output unit for outputting the information as a voice, a symbol indication unit for displaying and outputting information as a symbol containing alphanumeric characters, and a vibration output unit for outputting the information as vibrations.

7. An information service system as described in claim 5, wherein a selected one of the infrared light, a laser beam and ultrasonic sound is used for transmission of the information between said identification tag and said portable unit.

8. An information service system as described in claim 4 or 5, wherein said portable unit information output unit includes at least selected one of a voice output unit for outputting the information as a voice, a symbol indication unit for displaying and outputting information as a symbol containing alphanumeric characters, and a vibration output unit for outputting the information as vibrations.

9. An information service system as described in claim 8, wherein a selected one of the infrared light, a laser beam and ultrasonic sound is used for transmission of the information between said identification tag and said portable unit.

10. An information service system as described in anyone of claims 4 to 8, wherein a selected one of the infrared light, a laser beam and ultrasonic sound is used for transmission of the information between said identification tag and said portable unit.

11. An information service system as described in anyone of claims 4, 5, 8, 10, 6, 7, 9, wherein said predetermined information storage unit includes at least a selected one of an identification tag ID information storage unit for storing the identification tag ID information for specifying the user, a voice storage unit for storing the voice information and a symbol information storage unit for storing the symbol information including alphanumeric characters;
- wherein said identification tag control unit includes an information type setting unit for setting the type of information output from said identification tag ID information storage unit; and
- wherein said portable unit controller includes an information type determination unit for determining the type of the information contained in the carrier wave received by said portable unit receiver.

12. An information service system as described in claim 4, wherein said identification tag further includes a specified information changing unit for respectively changing the predetermined information stored in said predetermined storage unit or and the portable unit ID information stored in said portable unit ID information storage unit as applicable.

13. An information service system as described in claim 4, wherein said portable unit further includes a guide information changing unit for respectively changing the guide information stored in said portable unit controller or and the portable unit ID information stored in said portable unit ID information storage unit as applicable.

14. An information service system as described in claim 4, wherein said identification tag further includes an information synthesizer for synthesizing the portable unit ID information with the predetermined information stored in said predetermined information storage unit and generating the transmission information when the coincidence is detected between the portable unit ID information demodulated by said second identification tag control unit and the portable unit ID information stored in said portable unit ID information storage unit; and
- wherein said portable unit further includes a second portable unit controller for collating the portable unit ID information included in the transmission information received by said portable unit receiver with the portable unit ID information stored in said portable unit ID information storage unit and permitting said portable unit information output unit to output the guide information when said two portable unit ID information coincide with each other.

15. An information service system as described in claim 14, wherein said predetermined information storage unit includes an identification tag ID information storage unit for storing the identification tag ID information for specifying the user as the predetermined information.

16. An information service system as described in anyone of claims 14 or 15, wherein said portable unit information output unit includes at least a selected one of a voice output unit for outputting information as a voice, a symbol indication unit for displaying and outputting the information as a symbol including alphanumeric characters, and a vibration output unit for outputting the information as vibrations.

17. An information service system as described in claim 16, wherein a selected one of infrared light, a laser beam and ultrasonic sound is used for transmission of the information between said identification tag and said portable unit.

18. An information service system as described in claim 16, wherein said predetermined information storage unit includes at least a selected one of an identification tag ID information storage unit for storing the identification tag ID information for specifying the user, a voice storage unit for storing the voice information and a symbol information storage unit for storing the symbol information including alphanumeric characters;

wherein said identification tag control unit includes an information type setting unit for setting the type of information output from said identification tag ID information storage unit; and wherein said portable unit controller includes an information type determination unit for determining the type of information contained in the carrier wave received by said portable unit receiver.

19. An information service system as described in any one of claims 14 or 15, wherein a selected one of infrared light, a laser beam and ultrasonic sound is used for transmission of the information between said identification tag and said portable unit.

20. An information service s stem as described in claim 19, wherein said predetermined information storage unit includes at least a selected one of an identification tag ID information storage unit for storing the identification tag ID information for specifying the user, a voice storage unit for storing the voice information and a symbol information storage unit for storing the symbol information including alphanumeric characters;

wherein said identification tag control unit includes an information type setting unit for setting the type of information output from said identification tag ID information storage unit; and wherein said portable unit controller includes an information type determination unit for determining the type of information contained in the carrier wave received by said portable unit receiver.

21. An information service system as described in any one of claims 14 or 15, wherein said predetermined information storage unit includes at least a selected one of an identification tag ID information storage unit for storing the identification tag ID information for specifying the user, a voice storage unit for storing the voice information and a symbol information storage unit for storing the symbol information including alphanumeric characters;

wherein said identification tag control unit includes an information type setting unit for setting the type of information output from said identification tag ID information storage unit; and wherein said portable unit controller includes an information type determination unit for determining the type of information contained in the carrier wave received by said portable unit receiver.

22. An information service system as described in claim 14, wherein said identification tag further includes a specified information changing unit for changing at least a selected one of the predetermined information stored in said predetermined information storage unit and the portable unit ID information stored in said portable unit ID information storage unit.

23. An information service system as described in claim 14, wherein said portable unit further includes a guide information changing unit for changing at least a selected one of the guide information stored in said portable unit controller and the portable unit ID information stored in said portable unit ID information storage unit.

24. An information service system for supplying the user with information on the present position or a specific place which the user is approaching, comprising:

a portable unit carried by said user and an identification tag installed at a specific place, wherein said identification tag includes:

a predetermined information storage unit for storing predetermined information;

an identification tag control unit for generating the transmission information including the predetermined information stored in said predetermined information storage unit, and an identification tag transmitter for transmitting the transmission information generated in said identification tag control unit; and wherein said portable unit includes:

a portable unit receiver for receiving the transmission information transmitted from said identification tag transmitter;

a portable unit controller for selecting the guide information in accordance with the transmission information received by said portable unit receiver;

a portable unit information output unit for outputting the guide information selected by said portable unit controller;

wherein said predetermined information storage unit includes an identification tag ID information storage unit for storing the identification tag ID information for specifying the user as the predetermined information;

wherein said predetermined information storage unit includes selected one of an identification tag ID information storage unit for storing the identification tag ID information for specifying the user, a voice storage unit for storing the voice information and a symbol information storage unit for storing the symbol information including alpha-numeric characters;

wherein said identification tag control unit includes an information type setting unit for setting the type of the information output from said identification tag ID information storage unit; and wherein said portable unit controller includes an information type determination unit for determining the type of the transmission information received by said portable unit receiver.

25. An information service system for supplying the user with information on the present position or a specific place which the user is approaching, comprising:

a portable unit carried by said user and an identification tag installed at a specific place, wherein said identification tag includes:

a predetermined information storage unit for storing predetermined information;

an identification tag control unit for generating the transmission information including the predetermined information stored in said predetermined information storage unit, and an identification tag transmitter for transmitting the transmission information generated in said identification tag control unit; and wherein said portable unit includes:
a portable unit receiver for receiving the transmission information transmitted from said identification tag transmitter;
a portable unit controller for selecting the guide information in accordance with the transmission information received by said portable unit receiver; and
a portable unit information output unit for outputting the guide information selected by said portable unit controller;
wherein said information output unit of the portable unit includes at least one of the voice output unit for outputting the transmission information as a voice, a symbol display unit for displaying and outputting the transmission information as a symbol including alphanumeric characters and a vibration output unit for outputting the transmission information as vibrations;
wherein said predetermined information storage unit includes selected one of an identification tag ID information storage unit for storing the identification tag ID information for specifying the user, a voice storage unit for storing the voice information and a symbol information storage unit for storing the symbol information including alpha-numeric characters;
wherein said identification tag control unit includes an information type setting unit for setting the type of the information output from said identification tag ID information storage unit; and wherein said portable unit controller includes an information type determination unit for determining the type of the transmission information received by said portable unit receiver.

26. An information service system for supplying the user with information on the present position or a specific place which the user is approaching, comprising:
a portable unit carried by said user and an identification tag installed at a specific place, wherein said identification tag includes:
a predetermined information storage unit for storing predetermined information;
an identification tag control unit for generating the transmission information including the predetermined information stored in said predetermined information storage unit, and
an identification tag transmitter for transmitting the transmission information generated in said identification tag control unit; and wherein said portable unit includes:
a portable unit receiver for receiving the transmission information transmitted from said identification tag transmitter;
a portable unit controller for selecting the guide information in accordance with the transmission information received by said portable unit receiver;
a portable unit information output unit for outputting the guide information selected by said portable unit controller;
wherein selected one of infrared light, a laser beam and ultrasonic sound is used for transmitting the transmission information from said identification tag to said portable unit;
wherein said predetermined information storage unit includes selected one of an identification tag ID information storage unit for storing the identification tag ID information for specifying the user, a voice storage unit for storing the voice information and a symbol information storage unit for storing the symbol information including alpha-numeric characters;
wherein said identification tag control unit includes an information type setting unit for setting the type of the information output from said identification tag ID information storage unit; and
wherein said portable unit controller includes an information type determination unit for determining the type of the transmission information received by said portable unit receiver.

* * * * *